US010469260B2

(12) United States Patent
Hassan

(10) Patent No.: US 10,469,260 B2
(45) Date of Patent: Nov. 5, 2019

(54) MULTIPLE CRYPTOGRAPHIC KEY GENERATION FOR TWO-WAY COMMUNICATION

(71) Applicant: Microsoft Technology Licensing, LLC, Redmond, WA (US)

(72) Inventor: Amer Hassan, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 19 days.

(21) Appl. No.: 15/346,689

(22) Filed: Nov. 8, 2016

(65) Prior Publication Data
US 2018/0013559 A1 Jan. 11, 2018

Related U.S. Application Data

(63) Continuation of application No. 15/206,142, filed on Jul. 8, 2016.

(51) Int. Cl.
*H04L 9/00* (2006.01)
*H04L 9/08* (2006.01)
(Continued)

(52) U.S. Cl.
CPC ............ *H04L 9/0875* (2013.01); *H04L 1/004* (2013.01); *H04L 9/14* (2013.01); *H04L 25/0202* (2013.01);
(Continued)

(58) Field of Classification Search
CPC ............ H04L 9/0875; H04L 25/0212; H04L 25/0202; H04L 9/0866; H04L 9/14;
(Continued)

(56) References Cited

U.S. PATENT DOCUMENTS 5,241,597 A 8/1993 Bright
5,594,797 A 1/1997 Alan et al.
(Continued)

FOREIGN PATENT DOCUMENTS

CN 103167490 A 6/2013
CN 104584670 A 4/2015
(Continued)

OTHER PUBLICATIONS

Forman, et al., "A Generalized Scheme for the Creation of Shared Secret Keys through Uncorrelated Reciprocal Channels in Multiple Domains", In Proceedings of 18th Internatonal Conference on Computer Communications and Networks, Aug. 3, 2009, 8 pages.
(Continued)

*Primary Examiner* — Mohammad W Reza
(74) *Attorney, Agent, or Firm* — NovoTechIP International PLLC

(57) ABSTRACT

The embodiments provide a cryptography key for two communicating devices that is based on information known only to the devices. Each of the communicating devices determines the information without communicating key information related to the encryption key with the other. Each device receives a setup signal sent by the other device. Each device samples the received signal, generates sampling results, creates a plurality of keys based on the sampling results, selects a key of the plurality of keys based on criteria, and utilizes the selected key. The sets of plurality of keys may be created by creating each of the keys based on a different power threshold applied to the sampling results. The sets of plurality of keys may also be created by inputting the sampling results into each of a plurality of decoders to generate a key at each decoder that comprises a key of the plurality of keys.

23 Claims, 13 Drawing Sheets

(51) Int. Cl.
*H04L 9/14* (2006.01)
*H04L 25/02* (2006.01)
*H04L 29/06* (2006.01)
*H04L 1/00* (2006.01)
*H04W 12/00* (2009.01)

(52) U.S. Cl.
CPC ........ *H04L 25/0212* (2013.01); *H04L 63/061* (2013.01); *H04W 12/003* (2019.01); *H04L 63/0428* (2013.01); *H04L 2209/80* (2013.01); *H04W 12/00504* (2019.01)

(58) Field of Classification Search
CPC . H04L 63/06; H04L 63/0428; H04L 2209/80; H04L 2209/24; H04W 12/04
USPC .......................................................... 380/44
See application file for complete search history.

(56) References Cited

U.S. PATENT DOCUMENTS

| | | | |
|---|---|---|---|
| 5,604,806 | A | 2/1997 | Hassan et al. |
| 6,031,913 | A | 2/2000 | Hassan et al. |
| 6,173,005 | B1 | 1/2001 | Kotzin et al. |
| 6,307,882 | B1 | 10/2001 | Marzetta |
| 7,167,562 | B2 | 1/2007 | Milgram |
| 7,171,552 | B1 | 1/2007 | Bell |
| 7,263,140 | B2 | 8/2007 | Henttu |
| 7,418,596 | B1 | 8/2008 | Carroll et al. |
| 7,421,075 | B2 | 9/2008 | Hassan et al. |
| 7,634,088 | B2 | 12/2009 | Sasaoka et al. |
| 7,783,879 | B2 | 8/2010 | Krummel et al. |
| 7,949,032 | B1 | 5/2011 | Frost |
| 8,270,602 | B1 | 9/2012 | Forman et al. |
| 8,873,755 | B2 | 10/2014 | Mathur et al. |
| 8,909,194 | B2 | 12/2014 | Madhavan et al. |
| 8,964,986 | B2 | 2/2015 | Tahan et al. |
| 9,008,208 | B2 | 4/2015 | Khandani |
| 9,031,236 | B2 | 5/2015 | Donnangelo et al. |
| 9,042,544 | B2 | 5/2015 | Baek et al. |
| 9,130,693 | B2 | 9/2015 | Reznik et al. |
| 9,319,877 | B2 | 4/2016 | Ando |
| 2002/0158211 | A1 | 10/2002 | Gillispie |
| 2005/0244000 | A1 | 11/2005 | Coleman |
| 2006/0198520 | A1* | 9/2006 | Courtney ............. H04L 1/0056 380/247 |
| 2007/0036353 | A1 | 2/2007 | Reznik et al. |
| 2007/0058808 | A1 | 3/2007 | Rudolf et al. |
| 2007/0165845 | A1 | 7/2007 | Ye et al. |
| 2007/0291682 | A1 | 12/2007 | Anjum |
| 2009/0225982 | A1* | 9/2009 | Yener ..................... H04L 63/06 380/44 |
| 2009/0279700 | A1* | 11/2009 | Ye ......................... H04L 9/0875 380/270 |
| 2010/0085160 | A1 | 4/2010 | Fu |
| 2010/0135498 | A1 | 6/2010 | Long et al. |
| 2011/0130119 | A1 | 6/2011 | Gupta et al. |
| 2012/0159147 | A1 | 6/2012 | Ando |
| 2013/0077789 | A1 | 3/2013 | Tahan et al. |
| 2013/0236007 | A1 | 9/2013 | Munro et al. |
| 2013/0243187 | A1 | 9/2013 | Horstmeyer et al. |
| 2015/0048977 | A1 | 2/2015 | Khandani |
| 2015/0063566 | A1* | 3/2015 | Arakawa ............... H04L 9/0866 380/44 |
| 2015/0382187 | A1 | 12/2015 | Kruglick |
| 2016/0050219 | A1 | 2/2016 | Niewczas et al. |
| 2016/0055428 | A1 | 2/2016 | Raina et al. |
| 2016/0234008 | A1 | 8/2016 | Hekstra et al. |
| 2017/0289921 | A1 | 10/2017 | Kim et al. |
| 2018/0013553 | A1 | 1/2018 | Hassan |
| 2018/0013558 | A1 | 1/2018 | Hassan |
| 2019/0044712 | A1 | 2/2019 | Hassan et al. |

FOREIGN PATENT DOCUMENTS

| | | |
|---|---|---|
| WO | 2001054053 A1 | 7/2001 |
| WO | 2002009344 A1 | 1/2002 |
| WO | 2006130725 A2 | 12/2006 |

OTHER PUBLICATIONS

Dudley Croft, Jessica Erin, "Shared Secret Key Establishment Using Wireless Channel Measurements", In Doctoral Dissertation, Jul. 2011, 124 pages.

Ye, Chunxuan, "Information Theoretic Generation of Multiple Secret Keys", In Doctoral Dissertation, Retrieved on: Sep. 1, 2016, 156 pages.

Patwari, et al., "High-Rate Uncorrelated Bit Extraction for Shared Secret Key Generation from Channel Measurements", In Proceedings of IEEE Transactions on Mobile Computing, vol. 9, Issue 1, Jan. 2010, pp. 17-30.

Ohira, Takashi, "Secret Key Generation Exploiting Antenna Beam Steering and Wave Propagation Reciprocity", In Proceedings of European Microwave Conference, vol. 1, Oct. 4, 2005, 4 pages.

Wilson, et al., "Channel Identification: Secret Sharing Using Reciprocity in Ultrawideband Channels", In Proceedings of IEEE Transactions on Information Forensics and Security, vol. 2, No. 3, Sep. 2007, pp. 364-375.

Ren, et al., "Secret Key Generation Exploiting Channel Characteristics In Wireless Communications", In Journals of IEEE Wireless Communications, vol. 18, Issue 4, Aug. 2011, pp. 6-12.

"Non Final Office Action Issued in U.S. Appl. No. 15/206,142", dated Apr. 4, 2018, 15 Pages.

"Non Final Office Action Issued in U.S. Appl. No. 15/275,207", dated Apr. 19, 2018, 13 Pages.

"International Search Report and written opinion Issued in PCT Application No. PCT/US17/040561", dated Sep. 27, 2017, 12 Pages.

"International Search Report and Written Opinion Issued in PCT Application No. PCT/US17/040568", dated Dec. 20, 2017, 14 Pages.

"Final Office Action Issued in U.S. Appl. No. 15/206,142", dated Aug. 6, 2018, 18 Pages.

"Final Office Action Issued in U.S. Appl. No. 15/275,207", dated Aug. 23, 2018, 19 Pages.

"Non Final Office Action Issued in U.S. Appl. No. 15/206,142", dated Dec. 27, 2018, 17 Pages.

"Non Final Office Action Issued in U.S. Appl. No. 15/275,207", dated Jan. 18, 2019, 21 Pages.

Aono, "Wireless Secret Key Generation Exploiting Reactance—Domain Scalar Response of Multipath Fading Channel", In proceedings of IEEE Transactions on Antennas and Propagation, vol. 53, No. 11, Nov. 2005, pp. 3776-3783.

"Non Final Office Action Issued in U.S. Appl. No. 15/991,633", dated Jun. 13, 2019, 13 Pages.

Kravtsov, et al., "Physical layer secret key generation for fiber-optical networks", In Optics express , vol. 21, Issue 20, Sep. 30, 2013, pp. 23756-23771.

"International Search Report and Written Opinion Issued in PCT Application No. PCT/US19/032081", dated Jul. 24, 2019, 13 Pages.

* cited by examiner

MULTIPLE CRYPTOGRAPHIC KEY GENERATION FOR TWO-WAY COMMUNICATION

CROSS-REFERENCE TO RELATED APPLICATIONS

The present application is a Continuation-in-Part Application of, and takes benefit of, application Ser. No. 15/206,142 filed on 8 Jul. 2016, entitled CRYPTOGRAPHY METHOD, which is hereby incorporated in its entirety by reference.

BACKGROUND

Many cryptography methods require exchange of key information between two devices or require keys, or other information related to the encryption, to be stored in each of the two devices in order to encrypt and decrypt communications between the devices. A security concern with these methods is that the exchanged key information may be intercepted during the exchange, or the keys or other information related to the encryption that is stored on the devices may be compromised by theft or otherwise. A person in possession of the key information or other information related to the encryption may then intercept and decrypt the communications between the two devices. Key distribution is considered to be one of the most important elements in secure communications. Current methods require complex and expensive network security deployment. In most cases distribution of certificates to the devices must be performed.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

The embodiments of the disclosure include systems, devices, and methods that provide cryptography key generation for use in communication devices. In example implementations, key generation in each of two communicating devices is based on information that is determined at, and known only, to the two devices. The information on which the key generation is based may be determined in each of the devices at the time of communications. Each of the devices may determine the information without communicating any information related to the keys with each other over a channel or having knowledge of the information beforehand. The embodiments utilize the fact that a channel comprising communication links that are on the same frequency and opposite in direction between two devices shows reciprocity by exhibiting the same channel characteristics at each device. This reciprocity holds true if the channel characteristics are determined at the antenna of each device within a time window of appropriate duration, depending on channel conditions. For example, a time window in the range of less than 1 millisecond may be used. In example implementations of the embodiments, the information used to generate the keys in each device may be based on these reciprocal channel characteristics. Only the two devices may determine these channel characteristics and the channel characteristics will be knowable only to the two devices.

The embodiments include an implementation of a first device that communicates with a second device. The first device may be configured to send a first setup signal to the second device, receive a second setup signal from the second device, where the second setup signal may be a looped back version of the first setup signal, sample the second setup signal, generate sampling results, create a key based on the sampling results, and utilize the key to exchange one or more secure data signals with the second device. The first and second setup signals may be sent on the same frequency channel. In order to allow the second device to create a key, the first device may also be configured to receive a third setup signal from the second device and send a fourth setup signal to the second device, where the fourth setup signal may be a looped back version of the third setup signal. The third and fourth setup signals may each be sent on the same frequency channel on which the first and second setup signals are sent. The second device may then create a key in an identical manner by sampling the fourth signal. Use of identical setup signals for the first and third setup signals allows the first device to create a key that is identical to the key created in the second device with which it is communicating. The key may then be used to encrypt/decrypt data signals exchanged with the second device. Because of channel reciprocity, the two setup channels are identical in both directions of the device communications. In other implementations, the two setup channels may also be offset by a selected frequency delta.

In another implementation of a first device, the first device may be configured to receive a first setup signal from a second device, send a second setup signal to the second device, sample the first setup signal, generate sampling results, create a key based on the sampling results, and utilize the key to exchange one or more secure data signals with the second device. The first and second setup signals may be sent on the same frequency channel. The second device may create a key in an identical manner by sampling the second signal. In this implementation the setup signals are sent once and not looped back to the sending device of either the first or second device. Use of identical setup signals for the first and second setup signals allows the first device to create a key that is identical to the key created in the second device with which it is communicating. The key may then be used to encrypt/decrypt data signals exchanged with the second device.

In further example implementations, the first device may sample the setup signal received from the second device at each of a plurality of time intervals and create a plurality of samples. Each of the plurality of samples may be a set of bits indicating a magnitude of a sampled power level. The first device may generate sampling results from the plurality of samples by taking only selected sets of the plurality of samples having a magnitude above a threshold power magnitude. The first device may then create the key by using all or a portion of the sampling results as the key. In other implementations, the first device may create the key by inputting the selected sets of the plurality of samples into a decoder to generate a set of code words as the key. Alternatively, the first device may create the key by inputting a set of most significant bits of each of the selected sets of the plurality of samples into a decoder to generate a set of code words as the key. The first device may use the same process of key generation as performed in the second device with which it communicates in order that the first and second devices have the same key to encrypt and decrypt data communications.

In another example implementation, a key set that includes a plurality of possible keys for use in each of two communicating devices may be generated at each device from a sampled signal. In generating the keys, each key of the set may be associated with a different threshold power sampling level. An encryption/decryption key may be selected from the key set in each device for use. The selected key may then be used in encrypting and/or decrypting communications between the two devices. Also, in another example implementation, a set of parallel decoders may be used to generate a key set in each of two communicating devices from a sampled signal. In this implementation, each decoder of the set of parallel decoders may generate a key of the key set. An encryption/decryption key may be selected from the key set in each device for use.

Example implementations also include a network that includes a first device and a second device each configured to implement cryptography according to the embodiments. The first device may comprise a mobile device and the second device may comprise a device or apparatus in the network infrastructure. In an alternative, the first and second devices may each be a mobile device configured to communicate with other mobile devices.

DETAILED DESCRIPTION

Figure 1A:
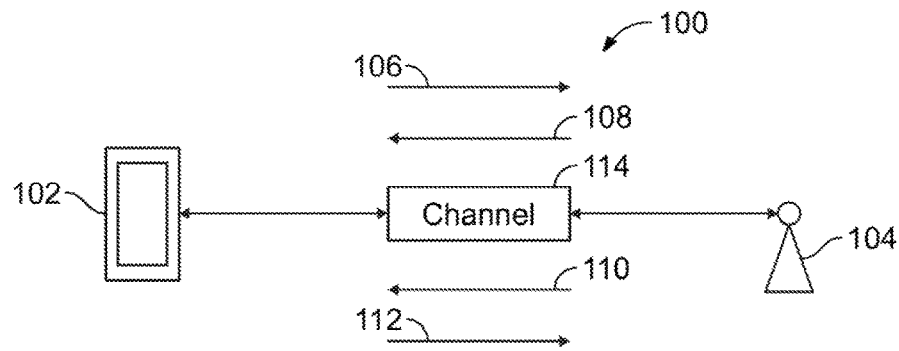
FIG. 1A is a simplified diagram illustrating an example network into which an embodiment of the disclosure may be implemented.

The system, devices, and methods will now be described by use of example embodiments. The example embodiments are presented in this disclosure for illustrative purposes, and not intended to be restrictive or limiting on the scope of the disclosure or the claims presented herein.

The disclosed embodiments provide a technical advantage in that two devices may configure encryption/decryption for secure communications on a channel between the two devices without exchanging keys or key related information over any channel, or by any other exchange methods, as a part of configuring or initiating the encryption/decryption. An advantage is also provided in that keys or key related information need not be provided to, or stored on, any of the devices prior to configuring the secure communications. As compared to cryptography methods that require exchange of keys or key related information by communicating devices when setting up secure communications, the embodiments prevent the possibility of exchanged key information being intercepted when exchanged between devices. As compared to cryptography methods in which devices rely on prior knowledge of keys or key information stored in the devices, the embodiments prevent the possibility that keys or key information may be compromised by theft or other misappropriation from a device or network.

The embodiments utilize the fact that a channel comprising communication links that are on the same frequency and opposite in direction between two devices shows reciprocity by exhibiting the same unique channel characteristics at each device. In order to maintain reciprocity of the channel during key generation, the time window within which the key generation occurs at each of the two devices may be relatively short. In an example implementation, time windows on the order of less than 1 millisecond may be used. Cryptography used to send secure signals between the two devices may be based on these reciprocal unique channel characteristics. The unique channel characteristics may be determined at each of the two devices by sampling a setup signal. The embodiments allow each of the two devices to create identical keys in both devices, where the key is based on the reciprocal unique channel characteristics determined by and known only to each of the two devices. The identical keys may then be used to decrypt and encrypt data signals sent between the two devices.

Because the unique channel characteristics are based on the conditions of the channel between the two devices at the time of key generation, the unique channel characteristics may be only known to each of the two devices on that channel. Only the two devices may determine these channel characteristics. A third device that attempts to intercept communications will not be able to decode the communications. The third device cannot intercept the keys or key information because the keys or key information are not exchanged on any channel. Neither will the third device be able to determine the keys by determining the keys from the unique channel characteristics of the channel, which by the nature of the channel can be known only to each of the two communicating devices that communicate on that channel. The embodiments also provide an advantage in that the keys generated in each of two devices may be updated as appropriate to provide additional security. Because the keys are generated based on the characteristics of the channel between the two devices at the time of key generation, each time new keys are generated the keys will be based on different channel characteristics and will be different from previously generated keys.

The embodiments have application to provide secure communications, for example, in time division duplex networks or systems such as those operating according to Wi-Fi implementations based on the IEEE 802.11 Standards. In Wi-Fi variants (using 802.11a, b, g, n and c), a device may communicate with an access point of a network on a wireless bi-directional time division half-duplex frequency channel. The device and access point use the same channel frequency (i.e., same channel) for transmissions sent from the device to the access point and transmissions sent from the access point to the device. Implementations of the embodiments in a Wi-Fi network may utilize the characteristics of the bi-directional frequency channel between the device and access point to generate keys for encrypting/decrypting communications. The embodiments also have application to networks or systems using communication channels configured according to other standards. For example, setup signals sent on a single frequency setup channel between two devices may be used to create identical keys in both devices, while actual encrypted communications between the two devices may be sent over communication channels different than the setup channel.

Example implementations of the embodiments also provide advantages in that the implementations may be used in networks or systems having devices with low quality reception or transmission capability. In these situations, one or both of the two communicating devices may not be capable of precisely sampling a setup signal to determine the unique channel characteristics of a channel between the two devices. In these cases, one or more bit errors may exist in the results of setup signal measurement and sampling in one or both of the devices and the sampling results may not be identical in both devices. If the keys were created directly from the sampling results the keys may not be identical in the two devices. Implementations of the embodiments may be used in order to make the process more reliable and robust in the type of situation when one or both of the devices are not capable of providing the same measurement accuracy or resolution of the received power level. These implementations provide for the situation in which the sampling results in the two devices may differ by one or more bits. In one implementation, sets of bits representing each of the sampling results may be fed into an error correction decoder in each device to generate a set of code words for use as the key. In another implementation, sets of bits each representing one or more most significant bits (MSBs) from each of the sampling results may be fed into an error correction decoder in each device to generate a set of code words for use as the key. Depending on the capability of the decoder, use of the decoder to generate the code words from the sampling results allows bit errors and discrepancies between the sampling results in the two devices to be removed. This helps ensure that the same key is created in both devices.

Referring now to FIG. 1A, therein is a simplified diagram illustrating an example network 100 into which an embodiment of the disclosure may be implemented. FIG. 1A shows device 102 communicating with device 104 over a channel 114. Device 102 may be a mobile device operating in the coverage area of network 100 and device 104 may be an access point of network 100. Channel 114 may comprise a time division half-duplex frequency channel that may be used by both device 102 and device 104 for exchanging communications with each other. In an implementation of Network 100, device 102 and device 104 may be configured to operate according to the IEEE 802.11 Wi-Fi specifications. In other implementations, device 102 and device 104 may operate according to any other wireless specification or standard that specifies channels that allow keys to be generated in communicating devices according to the embodiments.

Figure 1B:
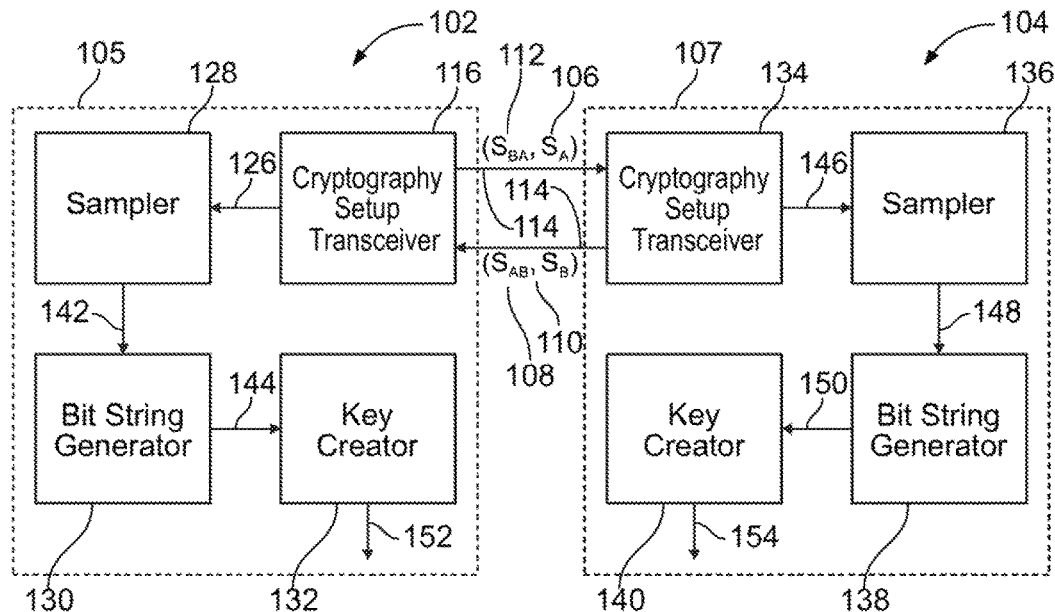
FIG. 1B is a simplified block diagram illustrating portions of example devices.

FIG. 1B is a simplified block diagram illustrating example portions of devices 102 and 104 in an implementation of FIG. 1A. Device 102 includes a portion 105 that includes cryptography setup transceiver 116, sampler 128, bit string generator 130, and key creator 132. Device 104 includes a portion 107 that includes cryptography setup transceiver 134, sampler 136, bit string generator 138, and key creator 140. Portion 105 communicates with other functions on device 102 and portion 107 communicates with other functions on device 104 to perform operations of cryptography according to the embodiments of the disclosure. Device 102 and 104 may each include one or more processors, circuitry, and/or code comprising programs for implementing, respectively, the functions shown in portions 105 and 107. The functions shown in portions 105 and 107 of devices 102 and 104 may be separately configured on each device, or may be configured as combined, in whole or in part, with processors, circuitry, and/or code or programs that are also in utilized for other functions on the devices. For example, cryptography setup transceivers 116 and 134 may include, respectively, the transceivers or portions of the transceivers in devices 102 and 104 that are also used for data communication.

Figure 2:
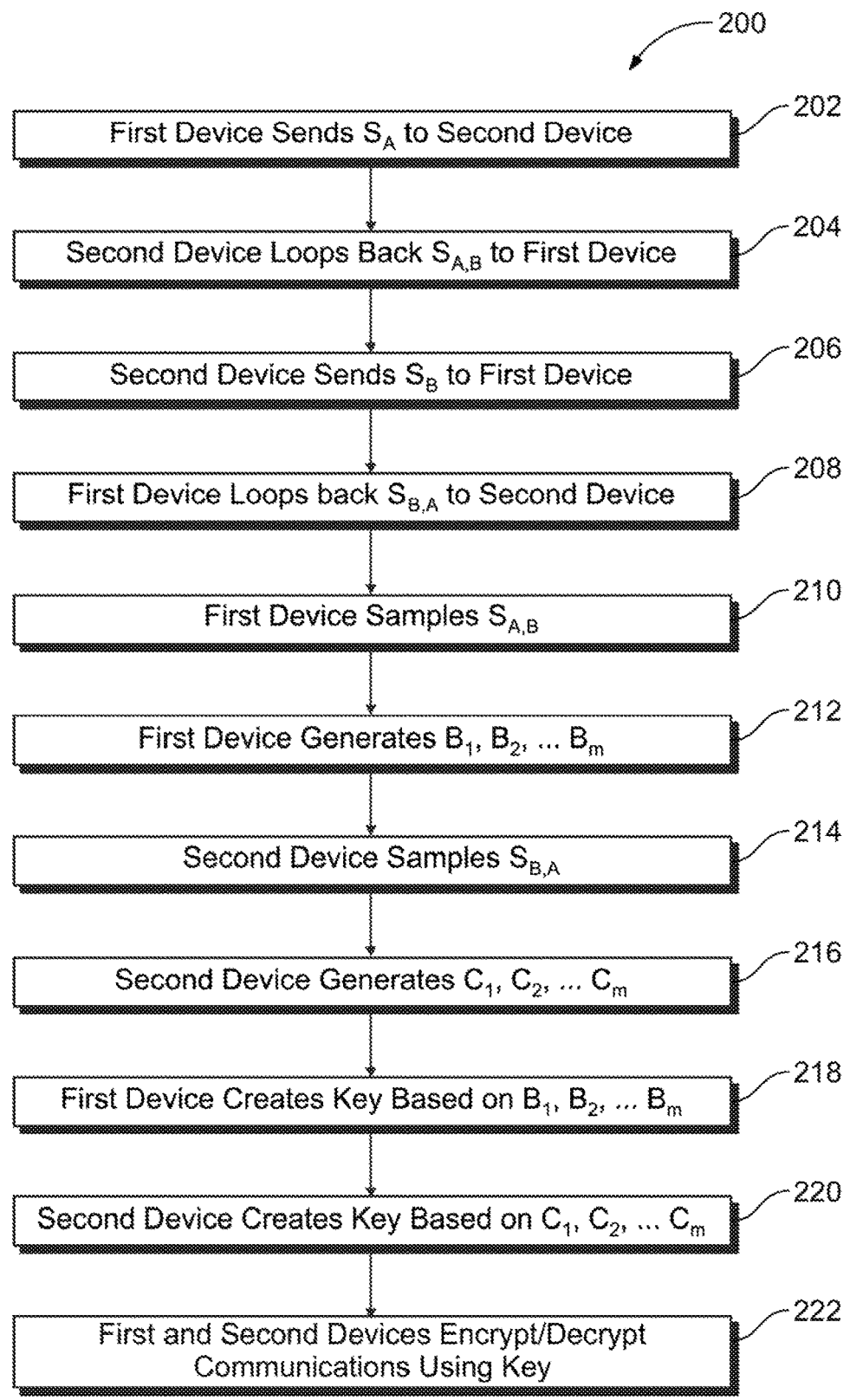
FIG. 2 is a flow diagram illustrating cryptography operations performed in example communicating devices.

FIG. 2 is a flow diagram 200 illustrating cryptography operations performed in example communicating devices, such as devices 102 and 104 of FIGS. 1A and 1B. The operations performed in FIG. 2 may be explained using device 102 as the first device and device 104 as the second device of FIG. 2.

The process begins at 202 where device 102 sends signal $S_A$ 106 to device 104 on channel 114 using cryptography setup transceiver 116. Signal $S_A$ 106 may be an analog signal such as a sinusoidal signal sent on the frequency of channel 114. At 204, device 104 receives signal $S_A$ using cryptography setup transceiver 134 and loops back signal $S_A$ 106 to device 102 as signal $S_{A,B}$ 108 on channel 114. Signal $S_{A,B}$ 108 may be identical to the signal $S_A$ 106 as it was received at cryptography setup transceiver 134. At 206 device 104 sends signal $S_B$ 110 to device 102 on channel 114 in the opposite direction using cryptography setup transceiver 134. Signal $S_B$ 110 may be an analog signal identical to signal $S_A$. At 208, device 102 receives signal $S_B$ 110 using cryptography setup transceiver 116 and loops back signal $S_B$ 110 to device 104 as signal $S_{B,A}$ 112 on channel 114. Signal $S_{B,A}$ 112 may be identical to the signal $S_B$ 110 as it was received at cryptography setup transceiver 116.

At 210, device 102 samples signal $S_{A,B}$ 108. To perform the sampling, cryptography setup transceiver 116 provides the received signal $S_{A,B}$ 108 to sampler 128 as signal 126 and sampler 128 performs sampling on signal $S_{A,B}$ 108 to generate sampling results. Sampler 128 may perform the sampling by generating a series of samples, $S_1, S_2 \ldots S_N$, with each sample taken from signal $S_{A,B}$ 108 at a predetermined time interval. Each sample of $S_1, S_2 \ldots S_N$ may comprise bits that represent a value of power of signal $S_{A,B}$ 108 at the time the sample was taken.

Next, at 212, device 102 generates a bit string from the results of the sampling on signal $S_{A,B}$ 108. In performing the bit string generation, sampler 128 provides the sampling results to bit string generator 130 as signal 142. Bit string generator 130 may then generate the bit string, $B_1, B_2 \ldots B_M$, from the sampling results. In generating the bit string, bit string generator 130 may use only the samples of $S_1, S_2 \ldots S_N$ that indicate a value of power above a threshold level. The threshold may be set to the median power level of the received signal $S_{A,B}$ 108 calculated over the time period within which the samples are taken. If the power of a sample $S_X$ is below the threshold it may be ignored. If the power of the sample $S_X$ is above the threshold the bits representing the power sample $S_X$ may be placed as a set in the bit string. The bit string generator 130 may process the complete sampling results in this manner to generate a bit string $B_1, B_2 \ldots B_M$ for use in key creation in device 102.

At 214, device 104 may initiate the same sampling and bit string generation operations on the signal $S_{B,A}$ 112 as performed in device 102 at operations 210 and 212 on the signal $S_{A,B}$ 108. To perform the sampling at device 104, cryptography setup transceiver 134 provides the received signal $S_{B,A}$ 112 to sampler 136 as signal 146 and sampler 136 performs sampling on signal $S_{B,A}$ 112 to generate sampling results. Sampler 136 may perform the sampling by generating a series of samples, $S'_1, S'_2 \ldots S'_N$, with each sample taken from signal $S_{B,A}$ 112 at a predetermined time interval. Each sample of $S'_1, S'_2 \ldots S'_N$ may comprise bits that represent a value of the power of signal $S_{B,A}$ 112 at the time the sample was taken. The time interval used for sampling in device 104 may be the same as the time interval used for sampling in device 102.

Next, at 216, device 104 generates a bit string from the results of the sampling on signal $S_{B,A}$ 112. In performing the bit string generation, sampler 136 provides the sampling results as signal 148 to bit string generator 138. Bit string generator 138 may then generate a bit string, $C_1, C_2 \ldots C_M$, from the sampling results. In generating the bit string, bit string generator 138 may use only the samples of $S'_1, S'_2 \ldots S'_N$ that indicate a value of power or amplitude above a threshold level. The threshold may be set to the median power level of the received signal $S_{B,A}$ 112 calculated over the time period within which the samples are taken. If the power of a sample $S'_X$ is below the threshold it may be ignored. If the power of the sample $S'_X$ is above the threshold the bits representing the power sample $S'_X$ may be placed as a set of bits in the bit string. The bit string generator 138 may process the complete sampling results in this manner to generate a bit string $C_1, C_2 \ldots C_M$ for use in key creation in device 104.

Use of signals $S_A$ and $S_B$ that are the identical, and use of processes for signal sampling and bit string generation that are the same in each of the devices 102 and 104, provides a bit string, $B_1, B_2 \ldots B_M$, and a bit string, $C_1, C_2 \ldots C_M$, that are identical, or nearly identical, to one another.

At 218, device 102 creates a key based on bit string $B_1, B_2 \ldots B_M$. The key is created in device 102 when bit string generator 130 provides bit string $B_1, B_2 \ldots B_M$ to key creator 132 as signal 144. Key creator 132 then creates the key from the bit string $B_1, B_2 \ldots B_M$. In one example implementation, key creator 132 may create the key using all of the bits in the bit string $B_1, B_2 \ldots B_M$ taken sequentially. For example, if the bit string $B_1, B_2 \ldots B_M$ is a string in which $B_1=11011011, B_2=10111011 \ldots B_M=11111101$, a key may be created as $K_{102}=1101101110111011 \ldots 11111101$. In another example, key creator 132 may create key $k_{102}$ using a subset of bits from each of $B_1, B_2 \ldots B_M$. For example, if the bit string $B_1, B_2 \ldots B_M$ is a string in which $B_1=11011011, B_2=10111011 \ldots B_M=11111101$, $k_{102}$ may be created by taking the four most significant bits from each $B_1, B_2 \ldots B_M$ to create $k_{102}=11011011 \ldots 1111$. Keys of different lengths may be created by varying the sampling, bit string generation, and key creation operations. Key creator 132 then outputs $k_{102}$ at output 152 for use by device 102 in encryption/decryption.

At 220, device 104 creates a key based on $C_1, C_2 \ldots C_M$ using the same operations that device 102 uses to create $k_{102}$ from $B_1, B_2 \ldots B_M$. The key is created in device 104 when bit string generator 138 provides bit string $C_1, C_2 \ldots C_M$ to key creator 140 as signal 150. Key creator 138 then creates a key, $k_{104}$, from the bit string $C_1, C_2 \ldots C_M$. In one example implementation, key creator 138 may create $k_{104}$ using all of the bits in the bit string $C_1, C_2 \ldots C_M$. For example, if the bit string $C_1, C_2 \ldots C_M$ is a string in which $C_1=11011011, C_2=10111011 \ldots C_M=11111101$, $k_{104}$, may be created as $k_{104}=1101101110111011 \ldots 11111101$. In another example, key creator 132 may create $k_{104}$ using a subset of bits from each of $C_1, C_2 \ldots C_M$. For example, if the bit string $C_1, C_2 \ldots C_M$ is a string in which $C_1=11011011, C_2=10111011 \ldots C_M=11111101$, $k_{104}$ may be created by taking the four most significant bits from each of $C_1, C_2 \ldots C_M$ to create $k_{104}=11011011 \ldots 1111$. Keys of different lengths may be created by varying the sampling, bit string generation, and key creation operations. The operations used for creating $k_{104}$ in device 104 may be identical to the operations used for creating $k_{102}$ in device 102. Key creator 140 then outputs $k_{104}$ at output 154 for use by device 104 in encryption/decryption.

In a situation in which devices 102 and 104 include transceivers that are capable of signal transmission at precise power levels and are also capable of precise measurement of received signals, the keys in both devices will have a high probability of being identical. In this situation, an implementation may be used in which $k_{102}$ and $k_{104}$ may be created directly from the sampling results by using all the bits of each of the sampling results $S_1, S_2 \ldots S_M$ and $S'_1, S'_2 \ldots S'_M$, respectively. In situations in which devices 102 and 104 include lower quality transceivers that are not capable of transmitting signals at precise power levels and/or are not capable of precise measurement of received signals, the keys created in each device may have a lower probably of being identical. In this type of situation, the implementation may be used in which $k_{102}$ and $k_{104}$ are created using only a subset of most significant bits from each of the sampling results $S_1, S_2 \ldots S_M$ and $S'_1, S'_2 \ldots S'_M$, respectively, to provide a more robust key creation process. Use of a subset of the most significant bits from each of the sampling results allows errors that occur in the less important bits of the sampling results to be removed and not cause differences between $k_{102}$ and $k_{104}$.

At 222, when the keys have been created in each of device 102 and 104, devices 102 and 104 may then communicate data signals with each other while encrypting and/or decrypting communications using, respectively, keys $k_{102}$ and $k_{104}$. If $k_{102}$ and $k_{104}$ have not been generated identically, because of transmission or reception conditions in the network, neither of the devices 102 or 104 will be capable of decrypting communications sent by the other. In this case one of the devices may determine that it cannot correctly decode transmissions and cause new keys to be created by initiating repetition of the process of FIG. 2.

In an alternative implementation of FIG. 2, the setup signal that is sampled at device 102 at operation 210 may be a setup signal that originates at device 104 rather than a setup signal that originates at device 102 and is looped back from device 104 to device 102. Similarly, in the alternative implementation the setup signal that is sampled at device 104 at operation 214 may be a setup signal that originates at device 102 rather than a setup signal that originates at device 104 and is looped back from device 102 to device 104. This alternative implementation may be used when devices 102 and 104 are able to transmit the setup signals at a selected transmit power level with good accuracy and the distance between devices 102 and 104 is known or determinable. In this case, the error variance of transmissions in each device from the selected transmit power level must be low. If the transmit power and the distance are known, the receiving device may calculate an expected power level for the received setup signal. The expected power level may be used to set the threshold for deciding which samples of the setup signal to keep for use in generating a bit string for key generation.

Also, in another implementation, one or more of the setup signals may be sent using channels offset from one another. For example, one or more of the signals sent in the direction from device 102 to device 104 (i.e., $S_{B,A}$ 112 and $S_A$ 106), and one or more of the signals sent in the direction from device 104 to device 102 (i.e., $S_{A,B}$ 108 and $S_B$ 110), may be sent on one or more frequency channels that are offset from the center frequency of channel 114. The amount of frequency offset may be chosen so that the reciprocity of the channel characteristics still allows generation of identical, or nearly identical, keys. For example, the offset may be a frequency offset of several percent of the center frequency of channel 114. Additionally, other offsets may be used as long as the offsets are of a magnitude that allows generation of the same encryption/decryption keys in each of the devices from the setup signals.

Figure 3A:
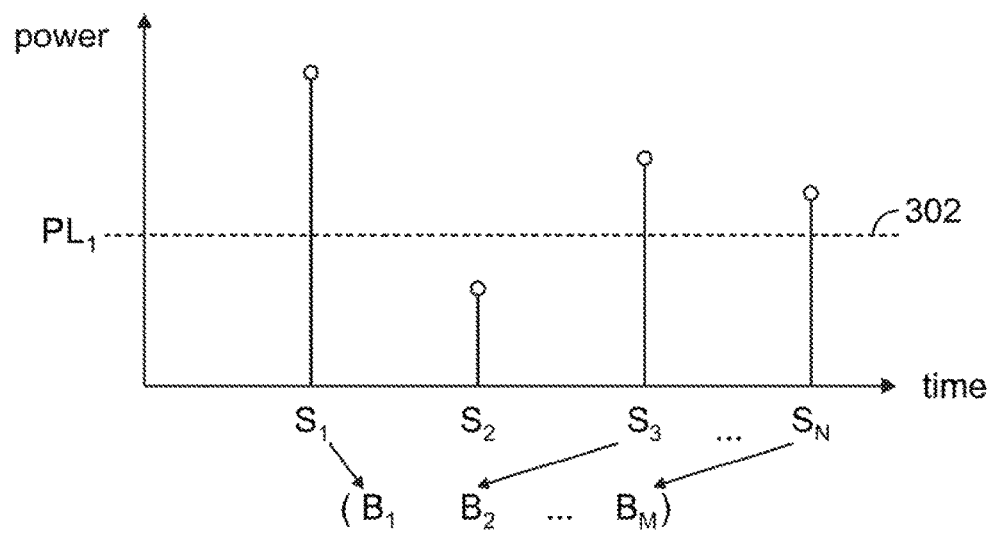
FIGS. 3A and 3B are plots illustrating sampling operations performed in example devices.
Figure 3B:
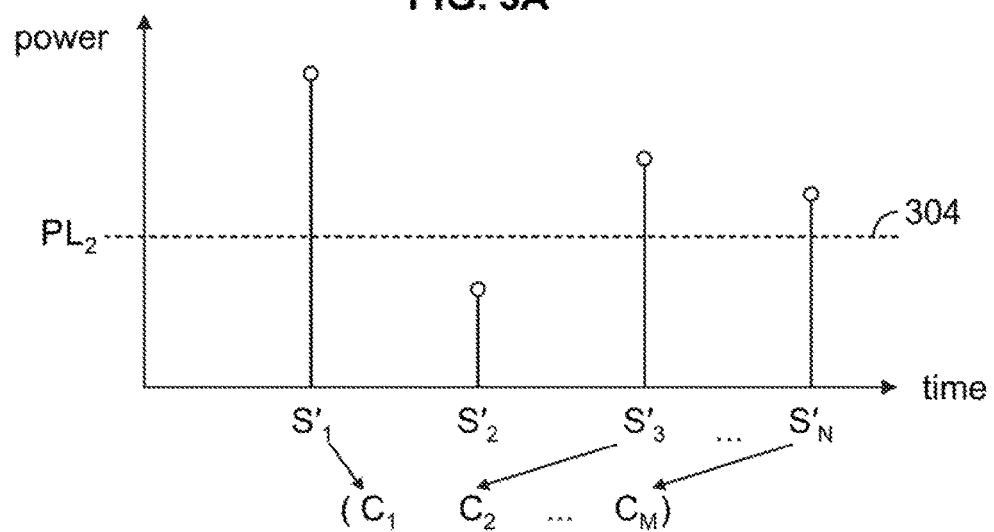

FIGS. 3A and 3B are plots illustrating sampling operations performed in example devices. FIG. 3A shows an example sampling of $S_{A,B}$ at operation 210 of FIG. 2. $S_1, S_2, S_3 \ldots S_N$ are samples taken of $S_{A,B}$ by sampler 128 at intervals of time that are shown along the time axis. Each sample is a bit string that indicates the value of a power level indicated by the height of the sample relative to the power axis. Similarly, FIG. 3B shows an example sampling of $S_{B,A}$ at operation 214 of FIG. 2. $S'_1, S'_2, S'_3 \ldots S'_N$ are samples taken of $S_{B,A}$ by sampler 136 at intervals of time that are shown along the time axis. Each sample comprises a bit string that indicates the value of a power level indicated by the height of the line associated with the sample relative to the power axis.

FIG. 3A also shows how bit string generator 130 may generate the bit string $B_1, B_2 \ldots B_M$ at operation 212. Bit string generator 130 may take each sample $S_1, S_3 \ldots S_N$, that is above a threshold power level, $PL_1$ (shown on the power axis), and create the bit string $B_1, B_2 \ldots B_M$ by inserting the bits of each of samples $S_1, S_3 \ldots S_N$ into $B_1, B_2 \ldots B_M$. In this example the number of samples, N, is less than the number of sets of bits, M, that are inserted into the bit string. In FIG. 3A, $S_2$ may be one sample that is discarded. If the values of the samples were $S_1$=10101010, $S_3$=11111111 ... $S_N$=11001100, the generated bit string would be $B_1$=10101010, $B_2$=1111111 ... $B_M$=11001100. The threshold power level $PL_1$ may be set to the median power level of the received signal $S_{A,B}$ 108 calculated over the time period within which the samples $S_1, S_3 \ldots S_N$ are taken.

Referring again to FIG. 3B, bit string generator 138 of device 104 may generate the bit string $C_1, C_2 \ldots C_M$ at operation 216 in a similar manner. Bit string generator 138 my take each sample $S'_1, S'_3 \ldots S'_N$ that is above a threshold power level, $PL_2$ (shown on the power axis), and create the bit string $C_1, C_2 \ldots C_M$ by inserting the bits of each of samples $S'_1, S'_3 \ldots S'_N$ into $C_1, C_2 \ldots C_M$. In the example of FIG. 3B, the number of samples, N, is less than the number of sets of bits, M, that are inserted into the bit string. In FIG. 3B, $S'_2$ may be one sample that is discarded. If the values of the samples were $S'_1$=10101010, $S'_3$=11111111 ... $S'_N$=11001100, the bit string would be $C_1$=10101010, $C_2$=11111111 ... $C_M$=11001100. The threshold power level $PL_2$ may be set to the median power level of the received signal $S_{B,A}$ 112 calculated over the time period within which the samples $S'_1, S'_3 \ldots S'_N$ are taken.

The bit string generated in operations 212 and 216 of FIG. 2 may be used to create a key as was described for operations 218 and 220 by taking all of the bits of the bit string to create the key. Subsets of the bits may also be used, for example by taking a number of most significant bits of each set of $B_1, B_2 \ldots B_M$ or $C_1, C_2 \ldots C_M$ to create a key. Effectively, this is taking a number of most significant bits of each sample of $S_1, S_2, S_3 \ldots S_N$ with a value above the threshold $PL_1$, and, each sample of $S'_1, S'_2, S'_3 \ldots S'_N$ with a value above the threshold $PL_2$. In other implementations, for a more robust key creation, and to avoid creating keys in each of devices 102 and 104 that differ, the keys may be created using an error correction decoder.

Figures 4A, 4B:
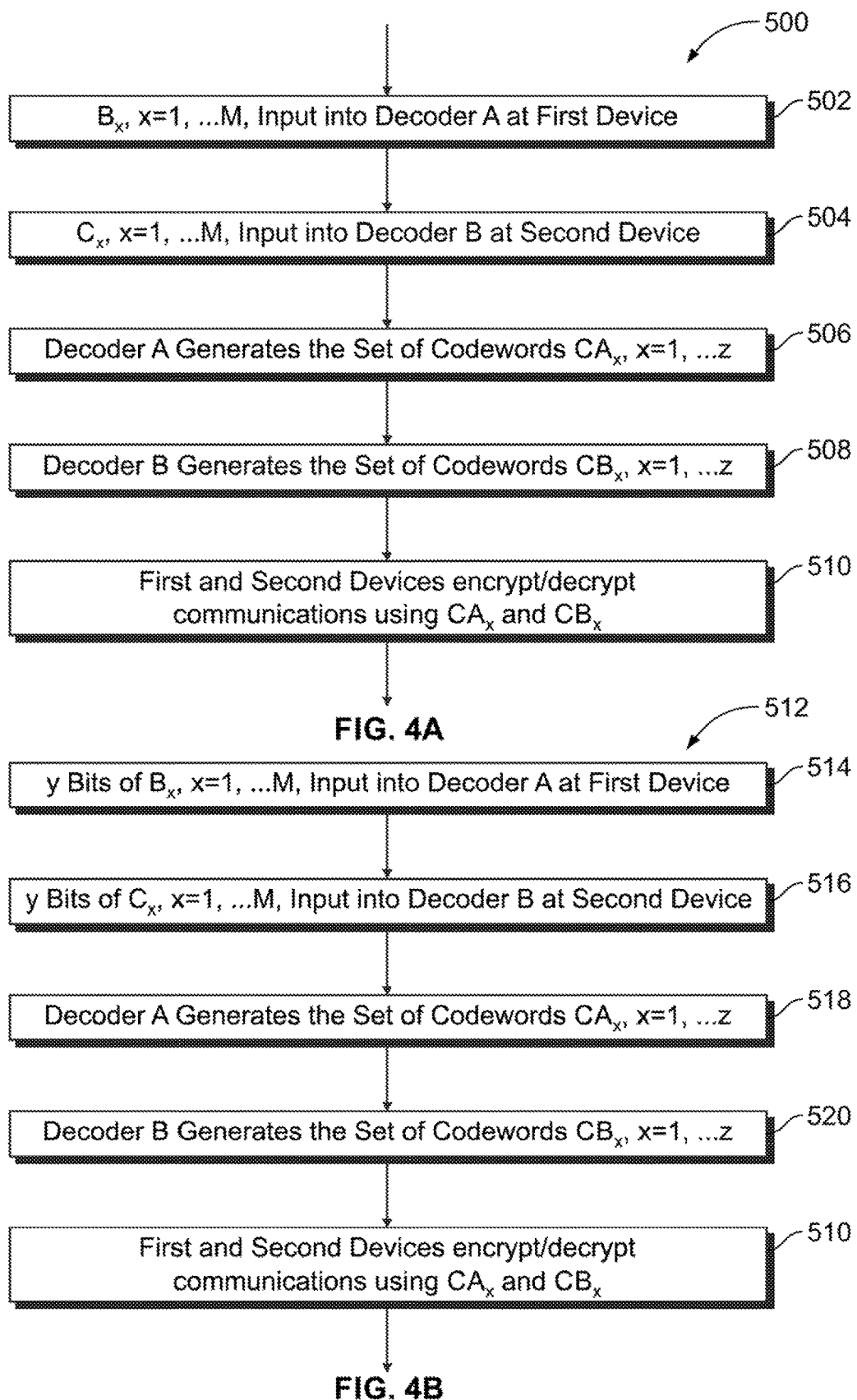
FIGS. 4A and 4B are flow diagrams illustrating example key creation operations using decoders.

FIG. 4A illustrates a process 400 that may be used by devices 102 and 104 in performing the key creation operations at 218 and 220 of FIG. 2. In the process, at 402, key creator 132 inputs the bit string $B_1, B_2 \ldots B_M$ into a decoder, decoder A, in device 102. Similarly, at 404, key creator 140 inputs the bit string $C_1, C_2 \ldots C_M$ into a decoder, decoder B, in device 104. At 406, decoder A generates a set of code words, $CA_1, CA_2 \ldots CA_M$, where each code word in the set corresponds to one of $B_1, B_2 \ldots B_M$. At 408, decoder B generates a set of code words, $CB_1, CB_2 \ldots CB_M$, where each code word in the set corresponds to one of $C_1, C_2 \ldots C_M$. Depending on the decoder used, each code word in the set $CA_1, CA_2 \ldots CA_M$ and each code word in the set $CB_1, CB_2 \ldots CB_M$ may be generated by the decoder to be one of Z potential different code words, where $Z=2^y$, and y=the number of bits in each set $B_X$ of $B_1, B_2 \ldots B_M$, or each set $C_X$ of $C_1, C_2 \ldots C_M$. In the implementation of FIG. 4A, y may equal the number of bits in each amplitude sample taken at operation 210 or 214. When the sets of code words have been created in each device, at 410 devices 102 and 104 encrypt and decrypt data signal communications between the two devices using the created code words.

FIG. 4B illustrates an alternative implementation of a process 412 that may be used by devices 102 and 104 in performing the key creation operations at 218 and 220 of FIG. 2. At 414, key creator 132 inputs y bits at a time into decoder A in device 102 from each set of the bits $B_1, B_2 \ldots B_M$. The y bits may comprise the y most significant bits of each set of bits in $B_1, B_2 \ldots B_M$. Similarly, at 416, key creator 138 inputs y bits at a time into decoder B in device 104 from each set of bits $C_1, C_2 \ldots C_M$. The y bits may comprise the y most significant bits of each set $C_X$ in $C_1, C_2 \ldots C_M$. At 418, decoder A generates a set of code words, $CA_1, CA_2 \ldots CA_M$, where each code word in the set is generated from the y bits of one of $B_1, B_2 \ldots B_M$. At 420, decoder B similarly generates a set of code words, $CB_1, CB_2 \ldots CB_M$, where each code word in the set is generated from the y bits of one of $C_1, C_2 \ldots C_M$. Depending on the decoder used, each code word in the set $CA_1, CA_2 \ldots CA_M$ and $CB_1, CB_2 \ldots CB_M$ may be generated by the decoder to be one of a total number of Z potential different code words, where $Z=2^y$. Then, at 422, devices 102 and 104 encrypt and decrypt data communications between the two devices using the generated set of code words.

Figure 5A:
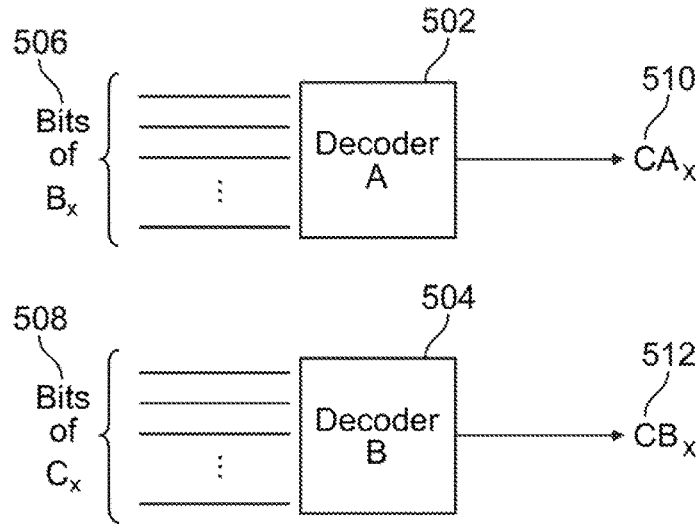
FIG. 5A is a simplified block diagram illustrating example key creation operations using decoders.

FIG. 5A is a simplified block diagram illustrating example key creation operations performed in the embodiment of FIGS. 4A and 4B. FIG. 4A shows decoder A and decoder B of, respectively, devices 102 and 104. Bits of each $B_X$ of $B_1, B_2 \ldots B_M$ 506 are separately fed into decoder A to generate a code word $CA_X$. The bits of each $B_X$ fed into decoder A may comprise all bits of $B_X$ as described for operation 402, or a set of y bits of $B_X$ as described for operation 414. When all $B_X$ of $B_1, B_2 \ldots B_M$ have been input into decoder A, a set of code words $CA_1, CA_2 \ldots C_M$ will be generated. Each of $CA_1, CA_2 \ldots C_M$ will correspond to one of $B_1, B_2 \ldots B_M$ and each of $CA_1, CA_2 \ldots C_M$ will be one of Z different code words, where $Z=2^y$ and y is the number of bits input into the decoder from each $B_1, B_2 \ldots B_M$. Similarly, bits of each $C_X$ of $C_1, C_2 \ldots C_M$ 508 are separately fed into decoder B to generate a set of code words $CB_1, CB_2 \ldots CB_M$ in an identical manner.

Figure 5B:
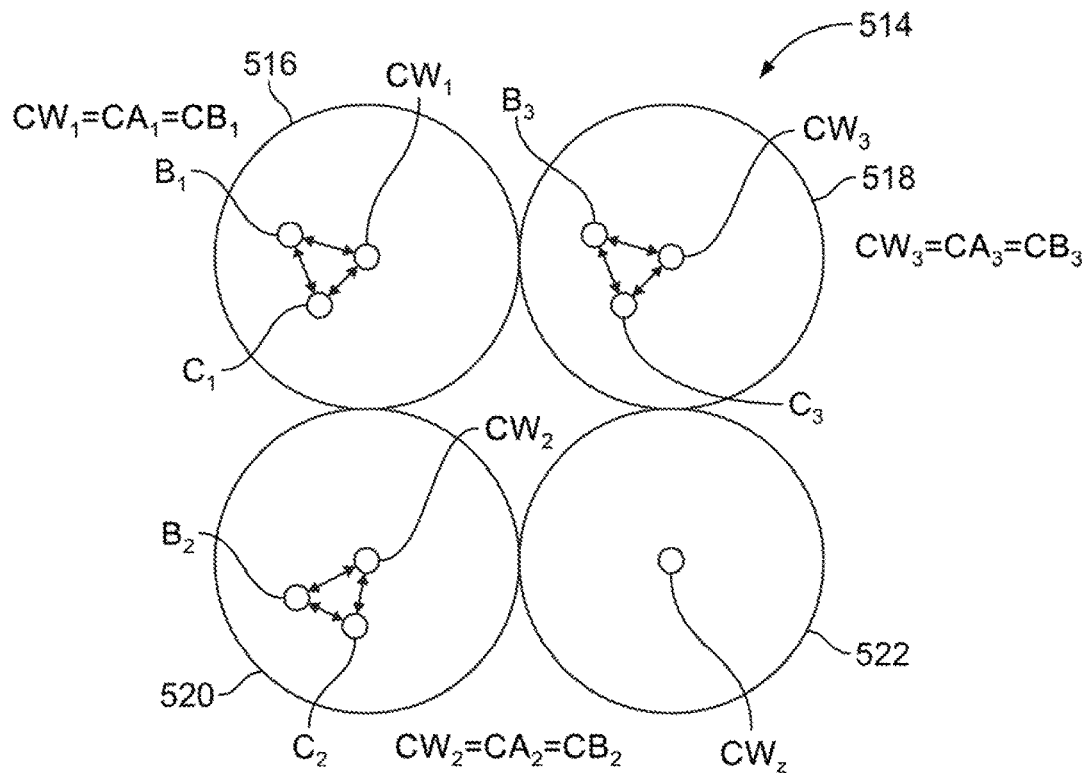
FIG. 5B is a diagram illustrating further example key creation operations using decoders.

FIG. 5B is a diagram illustrating further example operations of key creation using decoders. FIG. 5B shows how error code correction principles may be utilized to create identical keys in each of two communicating devices despite the presence of errors in the results of the sampling done on the setup signals. FIG. 5B shows use of decoders configured to use an error correction code having code words represented by the center points $CW_1, CW_2, CW_3 \ldots CW_Z$, respectively, of each circle 514, 516, 520, and 522. Each circle may represent, respectively, the decoding space of a code word $CW_1, CW_2, CW_3 \ldots CW_Z$. Binary values input to a decoder that fall into the decoding space of a code word $CW_X$ will be output by the decoder as $CW_X$. In the implementations, each of the code words in the communicating devices may be correlated with a code word of $CW_1, CW_2 \ldots CW_Z$. For example, $CA_1$ and $CB_1$ may be correlated with $CW_1$, and $CA_2$ and $CB_2$ may be correlated with $CW_2$.

Because of the way in which an error correction decoder operates, when any string of y bits entered into the decoder falls within the decoding space of a code word $CW_X$, the decoder will output code word $CW_X$. The size of the decoding space depends on the error correction capability of the decoder. Depending on the error correction code implemented in the decoder, two y-bit strings input into the decoder may contain different bits but still result in the same code word. $CW_X$ being output if the two different y-bit strings are both within the decoding space of $CW_X$. For example, $B_1$ and $C_1$ may each include different bits as input into the decoder, but both may be within the decoding space of $CW_1$ as long as the difference is within the error correction capability of the decoder. This error correction capability is commonly given in terms of capability to correct a certain number of bit errors in the decoder input as compared to an expected input for generating $CW_X$. For example, FIG. 5B shows $B_1$ and $C_1$ having different values but both being in the space of $CW_1$. This will result in the identical code word $CW_1$ being generated as $CA_1$ in device 102 and as $CB_1$ in device 104. Similarly, the same result will occur for $B_2$ and $C_2$ in the space of $CW_2$ to generate $CA_2$ and $CB_2$, and, for $B_3$ and $C_3$ in the space of $CW_3$ to generate $CA_3$ and $CB_3$.

If the decoder used in device 102 and device 104 has an error correction capability of x bits, then $B_X$ and $C_X$ may each differ from a code word $CW_X$ by up to x bits, but each still result in $CW_X$ being output from the decoder when $B_X$ and $C_X$ are input into the decoder. Because identical signals and the same process are used in both device 102 and 104 to generate the bit strings $B_1, B_2 \ldots B_M$ and $C_1, C_2 \ldots C_M$, these bit strings should be identical or, allowing for differences in the devices and/or RF environment, nearly identical. Use of the same decoder configuration in both of devices 102 and 104 allows bit strings $B_1, B_2 \ldots B_M$ and $C_1, C_2 \ldots C_M$ to be input into the decoder to generate identical sets of code words in device 102 and 104, even when $B_1, B_2 \ldots B_M$ and $C_1, C_2 \ldots C_M$ are not identical. As long as the differences between $B_X$ and $C_X$ are within a threshold that keeps them in the domain of the same code word, the same code words should be generated in each device. This provides more robust generation of identical keys in both devices.

Figure 6:
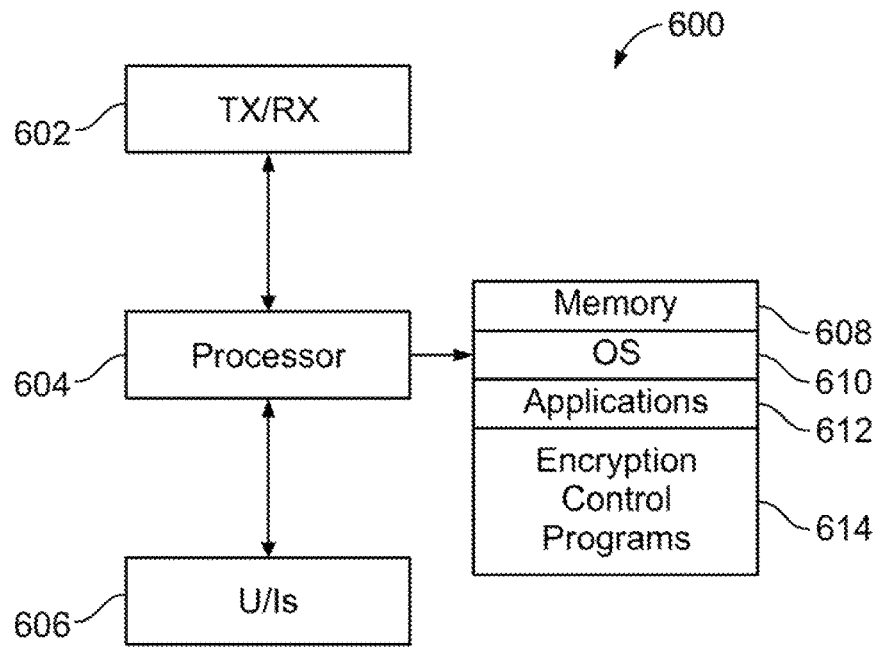
FIG. 6 illustrates an example device implemented as a mobile device.

Referring now to FIG. 6, therein is a simplified block diagram of an example device 600. The functions of device 102 of FIG. 1B may be implemented on a device such as device 600. In an example implementation, device 600 may be a mobile device. Device 600 may include a processor 604, memory 608, user interfaces (UIs) 606, and transceiver (TRX) 602. Memory 608 may be implemented as any type of computer readable storage media, including non-volatile and volatile memory. Memory 608 is shown as including code comprising device operating system (OS) 610, device applications 612, and encryption/decryption control programs 614. Processor 604 may comprise one or more processors, or other control circuitry, or any combination of processors and control circuitry. The encryption/decryption control programs 614 may provide the functions shown in device 102 in FIG. 1B. When executed, the encryption/decryption control programs 614 may cause processor 604 to control device 600 to perform processes described in relation to FIG. 2 and, FIGS. 4A and 4B.

User interfaces 606 may include any type of interface such as a touchscreen, a keypad, a voice controlled interface, interfaces that are gesture or motion based, an interface that receives input wirelessly, or any other type of interface that allows a user to provide appropriate control of device 600 for performing the operations of the embodiments.

In example implementations, device 600 may be any type of device that may be configured to communicate with a network or other device using encrypting/decrypting of data communications. For example, device 600 may be implemented in a smart phone, a tablet computer, a desktop computer, laptop computer device, gaming devices, media devices, smart televisions, multimedia cable/television boxes, smart phone accessory devices, tablet accessory devices, or personal digital assistants (PDAs). In an implementation, device 600 may operate according to a timed division half-duplexed communications standard. For example, device 600 may operate using half-duplex channels specified in the IEEE 802.11 Wi-Fi standards.

Figure 7:
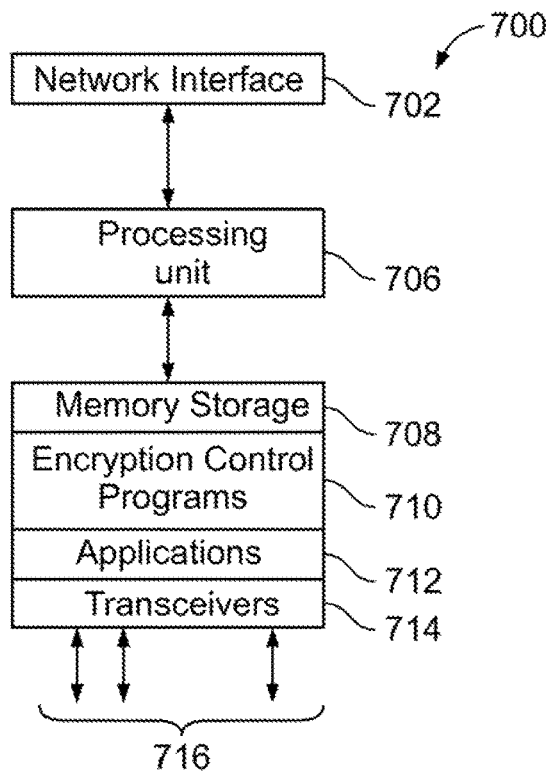
FIG. 7 illustrates an example device implemented as a network device.

Referring now to FIG. 7, therein is a simplified block diagram of another example device 700. Device 700 may be implemented, for example, as device 104 in the network 100 of FIG. 1A. In one implementation device 700 may be an access point such as a IEEE 802.11 Wi-Fi access point. Device 700 includes processing unit 706, transceivers 714, and memory/storage 708 that includes code comprising applications 712 and encryption control programs 710. The encryption/decryption control programs 710 may provide the functions shown in device 104 in FIG. 1B. When executed, the encryption/decryption control programs 710 may cause processor 706 to control device 700 to perform processes described in relation to FIG. 2 and, FIGS. 4A and 4B.

Memory 708 may be implemented as any type of computer readable storage media, including non-volatile and volatile memory. Access point 700 connects to a network, such as the interact, over network interface 702. Processing unit 706 may comprise one or more processors, or other control circuitry or any combination of processors and control circuitry that provide overall control of the access point according to the disclosed embodiments. Transceivers 712 provide the capability for device 700 to communicate with devices, for example device 102 of FIG. 1A, over channels 716, such as RF channels configured according to the Wi-Fi standards.

The example embodiments disclosed herein may be described in the general context of processor-executable code or instructions stored on memory that may comprise one or more computer readable storage media (e.g., tangible non-transitory computer-readable storage media such as memory 608 or 708). As should be readily understood, the terms "computer-readable storage media" or "non-transitory computer-readable media" include the media for storing of data, code and program instructions, such as memory 608, 708, and do not include portions of the media for storing transitory propagated or modulated data communication signals.

Figure 8A:
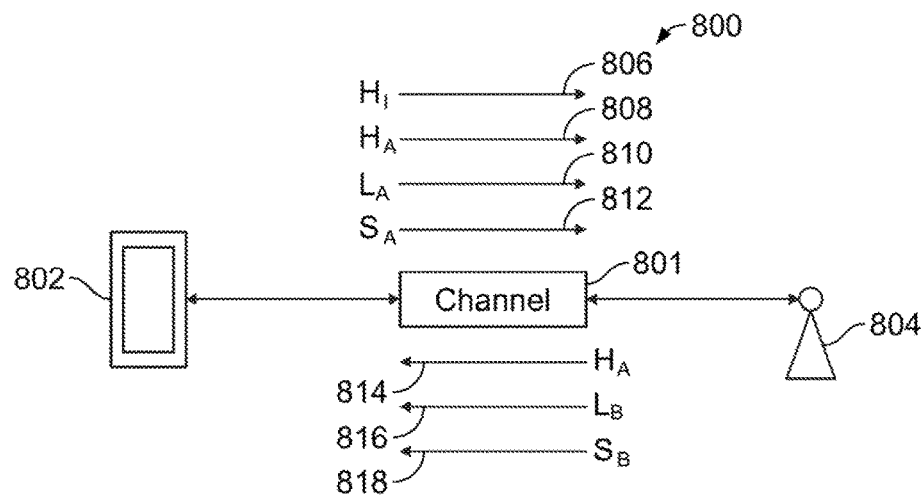
FIG. 8A is a simplified diagram illustrating another example network.

FIG. 8A is a simplified diagram illustrating an example network 800 into which another implementation of the embodiments may be implemented. FIG. 8A shows device 802 communicating with device 804 over a channel 801. Device 802 may be a mobile device operating in the coverage area of network 800 and device 804 may be an access point of network 800. Channel 801 may comprise a time division half-duplex frequency channel that may be used by both device 802 and device 804 for exchanging communications with each other. In an implementation of Network 800, device 802 and device 804 may be configured to operate according to the IEEE 802.11 Wi-Fi specifications. In other implementations, device 802 and device 804 may operate according to any other wireless specification or standard that specifies channels that allow keys to be generated in communicating devices according to the embodiments.

Figure 8B:
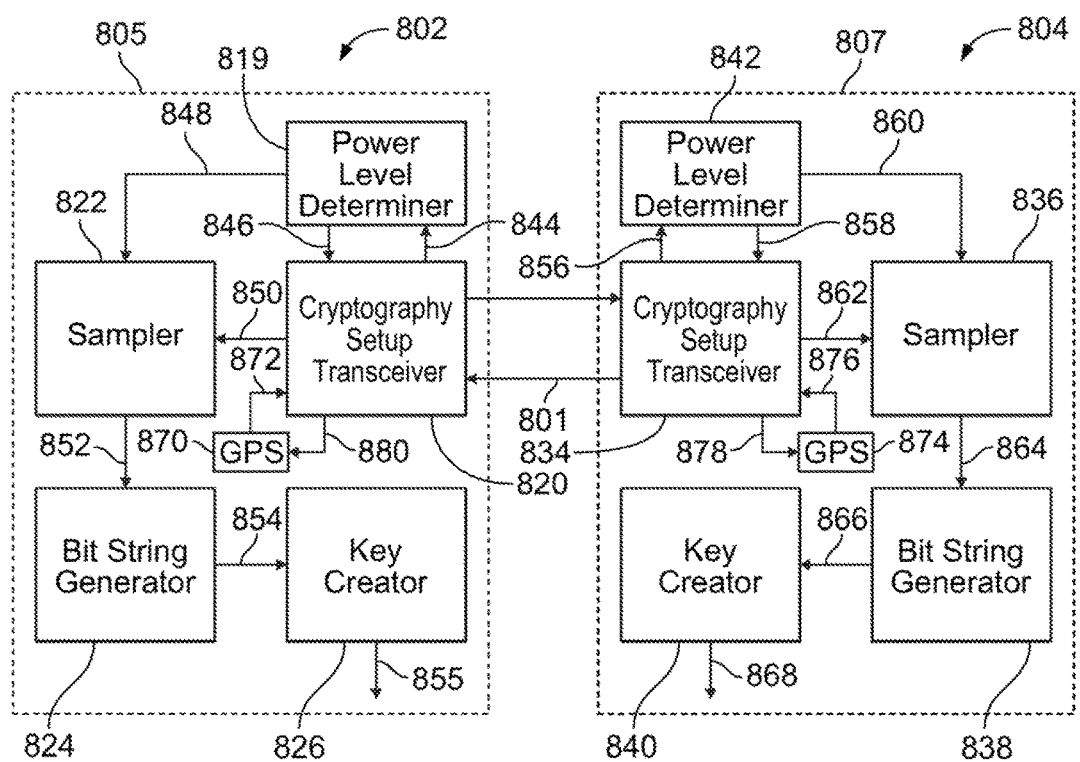
FIG. 8B is a simplified block diagram illustrating portions of further example devices.

FIG. 8B is a simplified block diagram illustrating example portions of devices 802 and 804 in an implementation of FIG. 8A. Device 802 includes a portion 805 that includes cryptography setup transceiver 820 sampler 822, bit string generator 824, key creator 826, GPS function 870, and power level determiner 819. Device 804 includes a portion 807 that includes cryptography setup transceiver 834, sampler 836, bit string generator 838, key creator 840, GPS function 874, and power level determine 842. Portion 805 communicates with other functions on device 802 and portion 807 communicates with other functions on device 804 to perform operations of cryptography according to the embodiments of the disclosure. Device 802 and 804 may each include one or more processors, circuitry, and/or code comprising programs for implementing, respectively, the functions shown in portions 805 and 807.

The functions shown in portions 805 and 807 of devices 802 and 804 may be separately configured on each device, or may be configured as combined, in whole or in part, with processors, circuitry, and/or code or programs that are also utilized for other functions on the devices. For example, cryptography setup transceivers 820 and 834 may include, respectively, the transceivers or portions of the transceivers in devices 802 and 804 that are also used for data communication. In an example implementation, device 802 may be implemented according to device 600 of FIG. 6. Encryption control programs 614 in memory 608 may then be configured to control processor 604 to provide the functions of device 802 shown in FIG. 8B. Also, device 804 may be implemented according to device 700 of FIG. 7. Encryption control programs 710 in memory 708 may then be configured to control processing unit 706 to provide the functions of device 804 shown in FIG. 8B.

In an implementation, a key set that includes a plurality of possible keys for use in each of two communicating devices may be generated from a sampled signal, with each key of the set being associated with a different threshold power sampling level. An encryption/decryption key may be selected from the key set in each device for use. The selected key may then be used in encrypting/decrypting communications between the two devices.

Figure 9A:
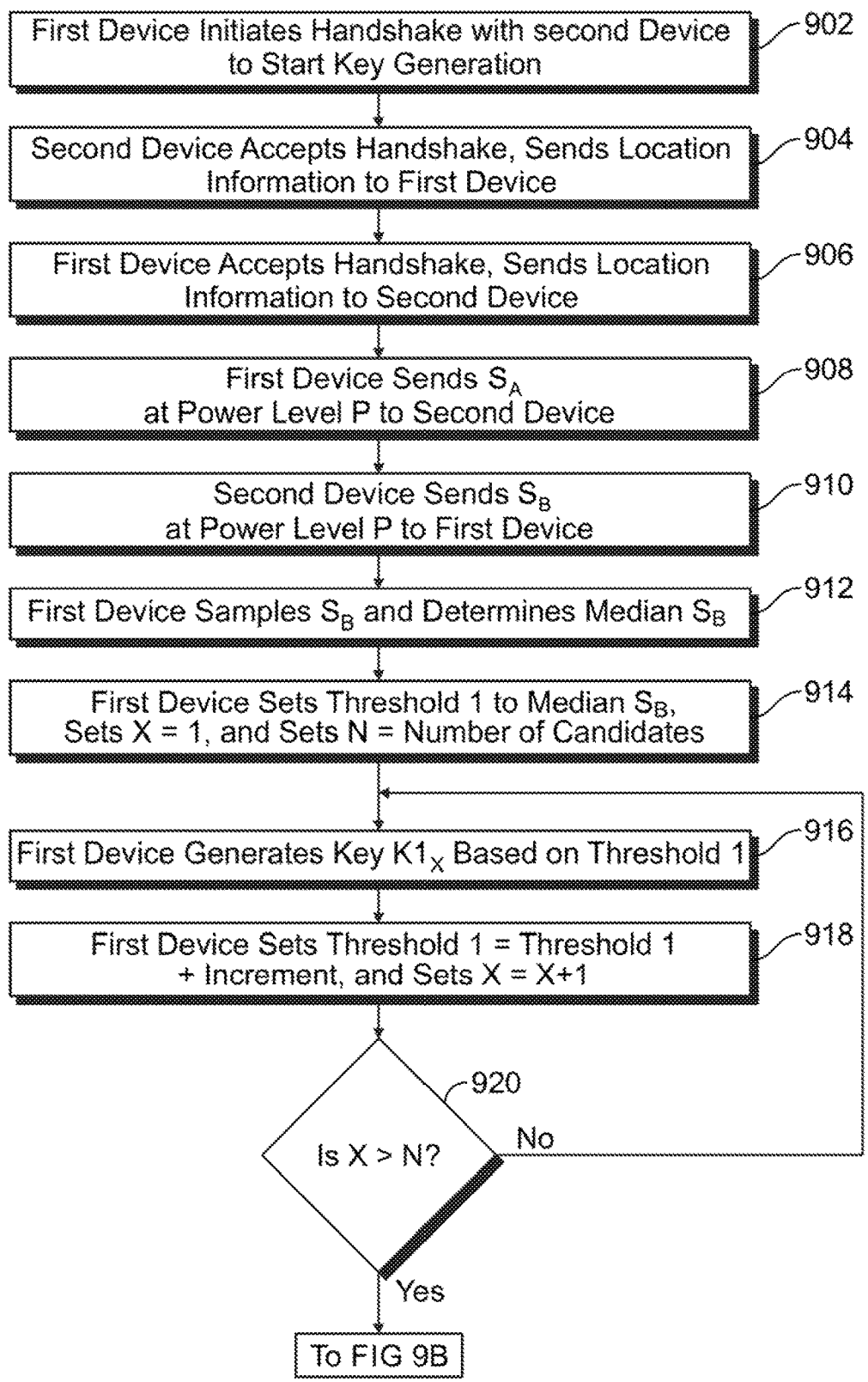
FIGS. 9A and 9B are flow diagrams illustrating example operations performed in the example devices of FIG. 8B.

FIG. 9A is a flow diagram illustrating cryptography operations performed in example communicating devices, such as devices 802 and 804 of FIGS. 8A and 8B. The operations performed in FIG. 9 may be explained using device 802 as the first device and device 804 as the second device of FIG. 9.

The process begins at 902 where device 802 sends signal $H_1$ 806 to device 804 on channel 801 using cryptography setup transceiver 820. Signal $H_1$ 806 is a handshake signal indicating to device 804 that device 802 is initiating a handshake to start key generation. At 904, device 804 receives signal $H_1$ 806 using cryptography setup transceiver 834 and sends signal $H_A$ 814 to device 802 on channel 801. Signal $H_A$ 814 is a handshake acceptance signal indicating to device 802 that device 804 has accepted the handshake and is ready to perform key generation. As part of handshake acceptance, at 904, device 804 also sends location information $L_B$ 816 about device 804's location determined by GPS function 874 to device 802. At 906, device 802 receives signals $H_A$ 814 and $L_B$ 816, and sends acceptance signal $H_A$ 808 to device 804 to confirm the initiation of key generation. At 906, device 802 also sends location information $L_A$ 810 about device 802's location determined by GPS function 870 to device 804. At 908, device 802 sends $S_A$ 812 to device 804 at transmission power level P on channel 801. Signal $S_A$ 812 may be a setup signal that is an analog signal such as a sinusoidal signal sent on the frequency of channel 801. The power level P may be determined by power level determiner 819 in device 802. Power level determiner 819 receives the location information $L_B$ 816 for device 804 (sent from device 804) and location information $L_A$ 810 for device 802 (which was also sent to device 804) from cryptography setup transceiver 820 as signal 844. Power level determiner 819 then determines P based on the relative locations of devices 802 and 804, and a target received power level at device 804. Power level determiner 819 then provides the power level P as signal 846 to cryptography setup transceiver 820 for use in sending $S_A$. In one implementation, the target received power level at device 804 may be a predetermined level that is stored in device 802. The target received power level may be stored for use in key generation upon configuration of key generation programs in device 802. In other implementations, the target received power level may be received from/negotiated with device 804 during key generation setup. The target received power level may also be a power level that is based on preferences of network 800 and received, for example, through device 804 implemented as an access point of network 800.

At 910, device 804 sends signal $S_B$ 818 to device 802 at transmission power level P on channel 114. Signal $S_B$ 818 may be a setup signal that is an analog signal identical to signal $S_A$ 812 such as a sinusoidal signal sent on the frequency of channel 801. The power level P may be determined by power level determiner 842 in device 804. Power level determiner 842 receives the location information $L_A$ 810 for device 802 (sent from device 802) and location information $L_B$ 816 for device 804 (which was also sent to device 802) from cryptography setup transceiver 834 as signal 856. Power level determiner 842 then determines P based on the relative locations of devices 802 and 804, and a target received power level at device 802. The target received power level may be the same target received power level used by device 802. Because the target received power level is the same in both devices, the transmission power level P at each device 802 and 804 should be the same. Power level determiner 842 then provides the power level P to cryptography setup transceiver 834 as signal 858 for use in sending $S_B$ 818. In one implementation, the target received power level at device 802 may be a predetermined level that is stored in device 804. The target received power level may be stored for use in key generation upon configuration of key generation programs in device 804. In other implementations, the target received power level may be received from/negotiated with device 802 during key generation setup. The target received power level may also be a power level that is based on preferences of network 800 and received, for example, by device 804 from a network controller.

At 912, device 802 samples signal $S_B$ 818. To perform the sampling, cryptography setup transceiver 820 provides the received signal $S_B$ 818 to sampler 822 as signal 850 and sampler 822 performs sampling on signal $S_B$ 818 to generate sampling results. Sampler 822 may perform the sampling by generating a series of samples, $S_1, S_2 \ldots S_N$, with each sample taken from signal $S_B$ 818 at a predetermined time interval. Each sample of $S_1, S_2 \ldots S_N$ may comprise bits that represent a value of power of signal $S_B$ 818 at the time the sample was taken. Sampler 822 may also determine the median power value of the samples $S_1, S_2 \ldots S_N$. Next, at 914, sampler 822 provides the sampling results to bit string generator 824 as signal 852. Bit string generator 824 sets a variable parameter, threshold 1, to the median power of the samples $S_1, S_2 \ldots S_N$. Bit string generator 824 also sets an index X to 1 and an index N to a number of candidates, where the number of candidates indicates a desired number of bit strings (keys) to be in a key set. At 916, bit string generator 824 generates a bit string or key $K1_X$ from the sampling results. In generating the bit string $K1_X$, bit string generator 824 may take only the samples of $S_1, S_2 \ldots S_N$ that indicate a value of power above the level of threshold 1 as part of the bit string $K1_X$. Each $K1_X$ is set as a string of the samples $S_1, S_2 \ldots S_N$ that indicate a value above threshold 1. In the initial pass through operation 916 threshold 1 is set to the median level determined at 914 and X is set to 1. Bit string generator 824 then sends $K1_1$ to key creator 826 as signal 854.

Next, at 918, bit string generator 824 increments threshold 1 by an increment. The increment may be any value of power. The increment may be an increment of power set to a value based on the median power determined at 914. For example, the increment may be set to a percentage of the median power. Bit string generator 824 also sets the index X to X+1. At 920, bit string generator 824 determines if X is greater than N. If X is not greater than N, the process returns to 916, and bit string generator 824 generates another bit string $K1_X$ for the incremented value of X, and repeats operations 918 and 920. Bit string generator 824 will continue branching back through operations 916, 918, and 920 until it is determined at 920 that X is greater than N. When it is determined at 920 that X is greater than N, bit string generator 924 will have generated a set of N bit strings or keys $K1_X$, for X=1 to N and the set of N bit strings $K1_X$, for X=1 to N will have been provided to key creator 826 of device 802.

At 921, device 804 samples signal $S_A$ 812. To perform the sampling, cryptography setup transceiver 834 provides the received signal $S_A$ 812 to sampler 836 as signal 862 and sampler 836 performs sampling on signal $S_A$ 812 to generate sampling results. Sampler 836 may perform the sampling by generating a series of samples, $S'_1, S'_2 \ldots S'_N$, with each sample taken from signal $S_A$ 812 at a predetermined time interval. Each sample of $S'_1, S'_2 \ldots S'_N$ may comprise bits that represent a value of power of signal $S_A$ 812 at the time the sample was taken. Sampler 836 may also determine the median power value of the samples $S'_1, S'_2 \ldots S'_N$. Next, at 922, sampler 836 provides the sampling results to bit string generator 838 as signal 864. Bit string generator 838 sets a variable parameter, threshold 2, to the median power of the samples $S'_1, S'_2 \ldots S'_N$. Bit string generator 838 also sets an index Y to 1 and an index M to a number of candidates, where the number of candidates indicates a desired number of bit strings (keys) to be in a key set. At 924, bit string generator 838 generates a bit string $K2_Y$ from the sampling results. In generating the bit string $K2_Y$, bit string generator 838 may take only the samples of $S'_1, S'_2 \ldots S'_N$ that indicate a value of power above the level of threshold 2 as the bit string $K2_Y$. Each $K2_Y$ is set to the value of the samples $S'_1, 'S'_2 \ldots S'_N$ that indicate a value above threshold 2. In the initial pass through operation 924, threshold 2 is set to the median level determined at 921 and Y is set to 1.

Bit string generator 838 then provides $K2_1$ to key creator 868 as signal 866. Next, at 926, bit string generator 838 increments threshold 2 by an increment. The increment may be any value of power and may be equal to the increment used in device 802. The increment may be an increment of power set to a value based on the median power determined at 914. For example, the increment may be set to a percentage of the median power. Bit string generator 838 also sets the index Y to Y+1. At 928, bit string generator 838 determines if Y is greater than M. If Y is not greater than M, the process returns to 924, and bit string generator 838 generates another bit string $K2_Y$ for the incremented value of Y, and repeats operations 924, 926 and 928. Bit string generator 838 will continue branching back through operations 924, 926, and 928 until it is determined at 928 that Y is greater than N. When it is determined at 928 that Y is greater than M, bit string generator 838 will have generated a set of M bit strings $K2_Y$, for Y=1 to M and the set of M bit strings $K2_Y$, for Y=1 to M will have been provided to key creator 840 of device 804.

At 930, key creator 826 generates a key set $K1_1, K1_2, K1_3 \ldots, K1_N$ in device 802 from each of the bit strings provided by bit string generator 824, and, at 932, key creator 830 generates a key set $K2_1, K2_2, K2_3 \ldots, K2_M$ in device 804 from each of the bit strings provided by bit string generator 838. At 934, key creator 826 selects a key $K1_Z$ from the key set $K1_1, K1_2, K1_3 \ldots, K1_N$ for use in device 802 based on a criteria, and, at 936, key creator 840 selects a key $K2_Z$ from the key set $K1_1, K1_2, K1_3 \ldots, K1_N$ for use in device 804 based on the same criteria. The criteria may be a test that the selected key functions appropriately. Devices 802 and 804 may select the keys $K1_Z$ and $K2_Z$ by using a test key at each device to encrypt test communications between the devices, and then select a pair that functions correctly.

Figure 9B:
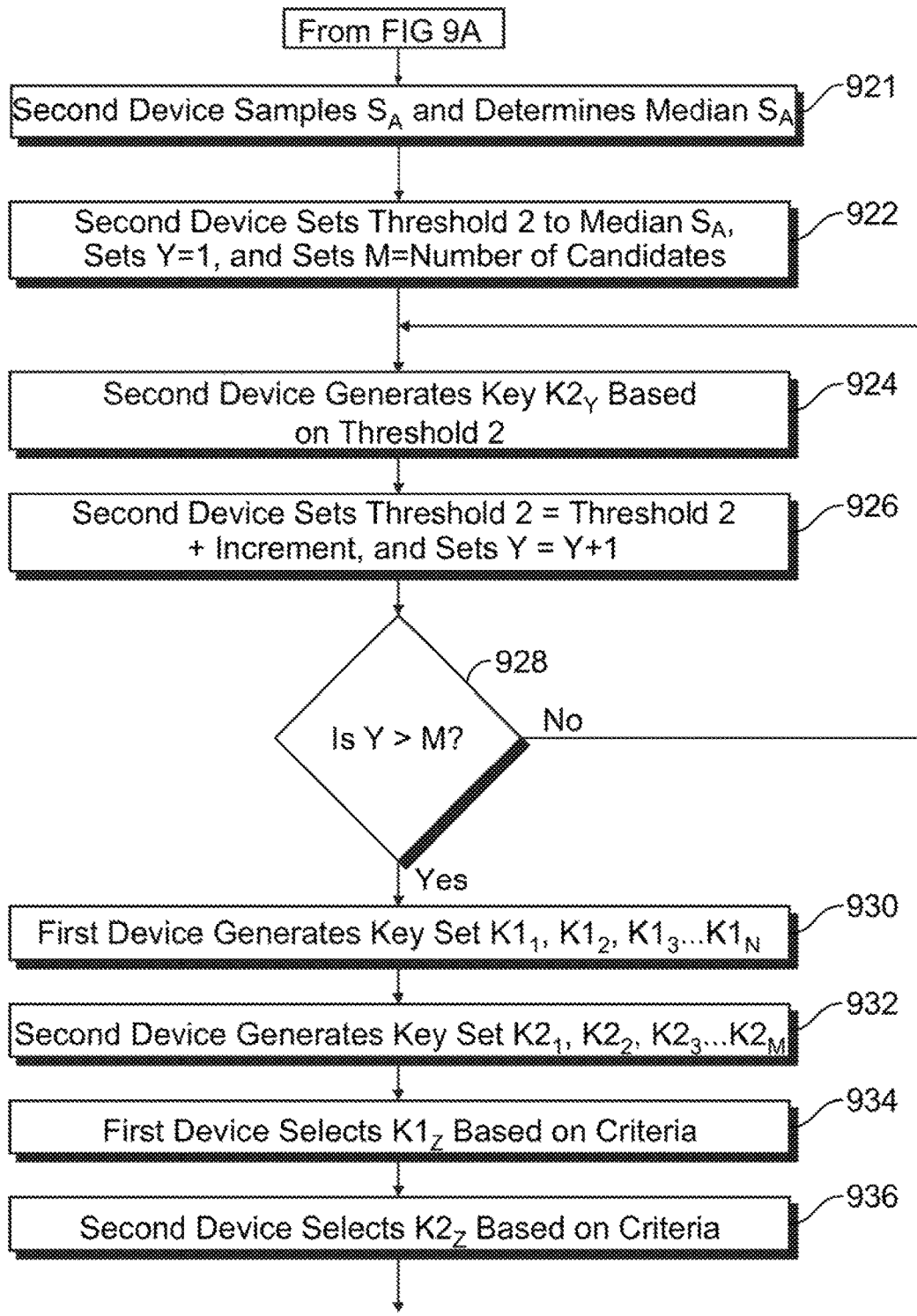
Figure 9C:
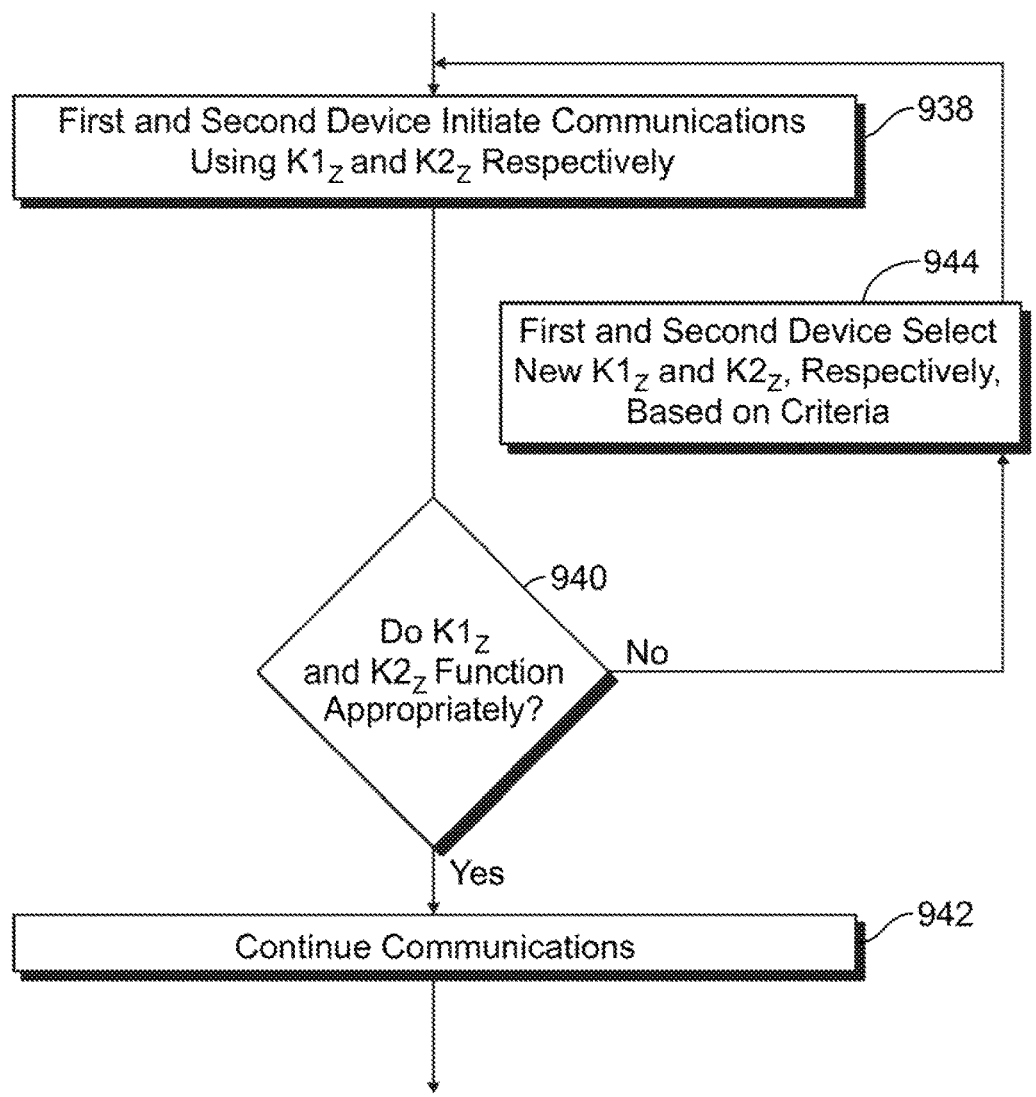
FIG. 9C is a flow diagram illustrating further example operations performed in the example devices of FIG. 8B.

FIG. 9C is a flow diagram illustrating further example operations performed to select a key from a key set in the process of FIG. 9B. The operations of FIG. 9C may be used by devices 802 and 804 at operations 934 and 936 of FIG. 9B.

At 938, key creators 826 and 840 in devices 802 and 804 select a key, $K1_Z$ and $K2_Z$ from the set of keys $K1_1, K1_2, K1_3 \ldots, K1_N$ and the set of keys $K2_1, K2_2, K2_3 \ldots, K2_M$, respectively. On the initial performance of 938, Z may equal 1 and the selected keys may be $K1_1$ and $K2_1$. If each of devices 802 and 804 performed identical processes during key generation the keys $K1_X$ and $K2_Y$ should be identical, or nearly identical, when X=Y=Z. At 940, devices 802 and 804 may communicate encrypted test signals between cryptography setup transceivers 820 and 834 to determine whether the keys have been generated correctly in each device, i.e., to determine whether the keys are the same and function appropriately. If the test signals are correctly encrypted and decrypted at both devices 802 and 804, the process moves to 942 and the currently selected key $K1_Z$ and $K2_Z$ are used by devices 802 and 804 to continue encrypting and decrypting communications between devices 802 and 804. If the test signals are not correctly encrypted and decrypted at both devices 802 and 804, the process moves to 944. At 944 device 802 and 804 select a different $K1_Z$ and $K2_Z$ from the set of $K1_1$, $K1_2$, $K1_3$ ..., $K1_N$ and the set of keys $K2_1$, $K2_2$, $K2_3$ ..., $K2_M$, respectively. The keys may be selected at 944 by incrementing an index that determines the value of Z. For example, in an implementation in which Z equals 1 on the initial performance of 938, Z may be incremented by 1 at each pass though operation 944. In this manner keys $K1_1$ and $K2_1$ are tested first, followed by keys $K1_2$ and $K2_2$, and then keys $K1_3$ and $K2_3$, up to keys $K1_N$ and $K2_M$ in sequence. In the implementation, because device 802 and 804 perform identical operations on signals $S_B$ and $S_A$, respectively, N is equal to M.

From 944 the process moves to 938 and the operations of 938, 940, and 944 are repeated until the currently selected keys $K1_Z$ and $K2_Z$ that were selected at the last performance of operation 944 are determined to function appropriately. The process then moves to 942 and the current selected keys $K1_Z$ and $K2_Z$ are used by devices 802 and 804 to continue encrypting and decrypting communications between devices 802 and 804.

In another implementation, a set of parallel decoders may be used to generate a key set in each of two communicating devices from samples of exchanged set up signals and an encryption/decryption key may be selected from the key set in each device for use. The selected keys may then be used in encrypting/decrypting communications between the two devices.

Figure 10A:
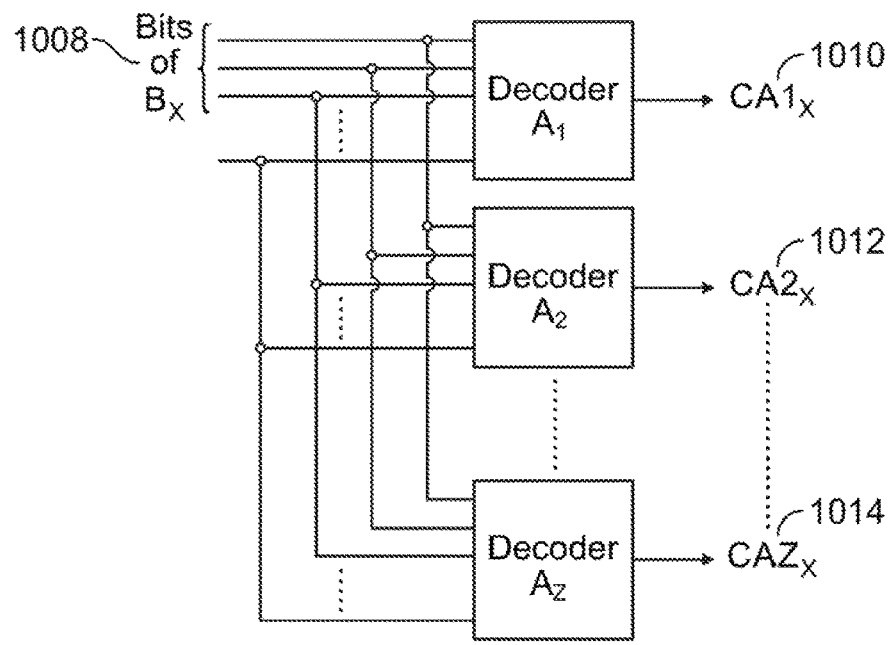
FIGS. 10A and 10B are block diagrams illustrating example key creation operations that utilize parallel decoders.
Figure 10B:
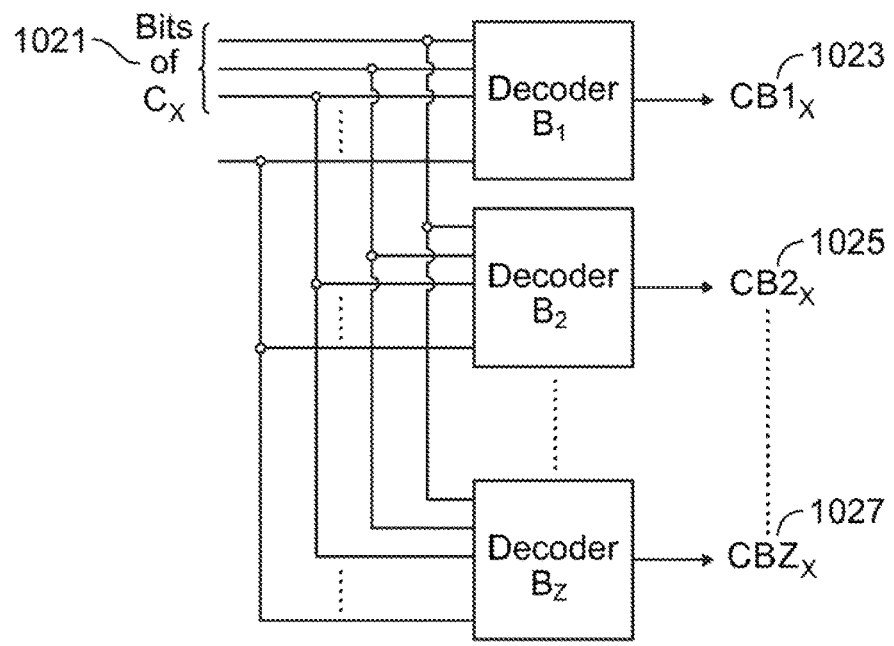

FIGS. 10A and 10B are block diagrams illustrating example parallel decoders for generating a key set in a device. FIG. 10A shows decoders $A_1$-$A_Z$. The value Z may be set to the number of keys in the set of keys to be generated by decoders $A_1$-$A_Z$. In operation, decoders $A_1$-$A_Z$ each receive parallel input of bits of $B_X$ 1008 and generate code words $CA1_X$-$CAZ_X$, respectively. Similarly, FIG. 10B shows decoders $B_1$-$B_Z$. In operation, decoders $B_1$-$B_Z$ each receive parallel input of bits of $C_X$ 1008 and generate code words $CB1_X$-$CBZ_X$, respectively. In an implementation, each of decoders $A_1$-$A_Z$ may be configured with a different error correction capability that increases as the index Z increases. For example, decoder $A_1$ may have an error correction capability of x bits, decoder $A_2$ may have an error correction capability of x+y bits, and decoder $A_Z$ may have an error correction capability of x+(z−1)y bits. Each decoder of decoders $B_1$-$B_Z$ is configured identically to the corresponding decoder of decoders $A_1$-$A_Z$ having the same index. For example, decoder $A_1$ and decoder $B_1$ are identical, decoder $A_Z$ and decoder $B_Z$ are identical and ..., decoder $A_Z$ and decoder $B_Z$ are identical.

Figure 10C:
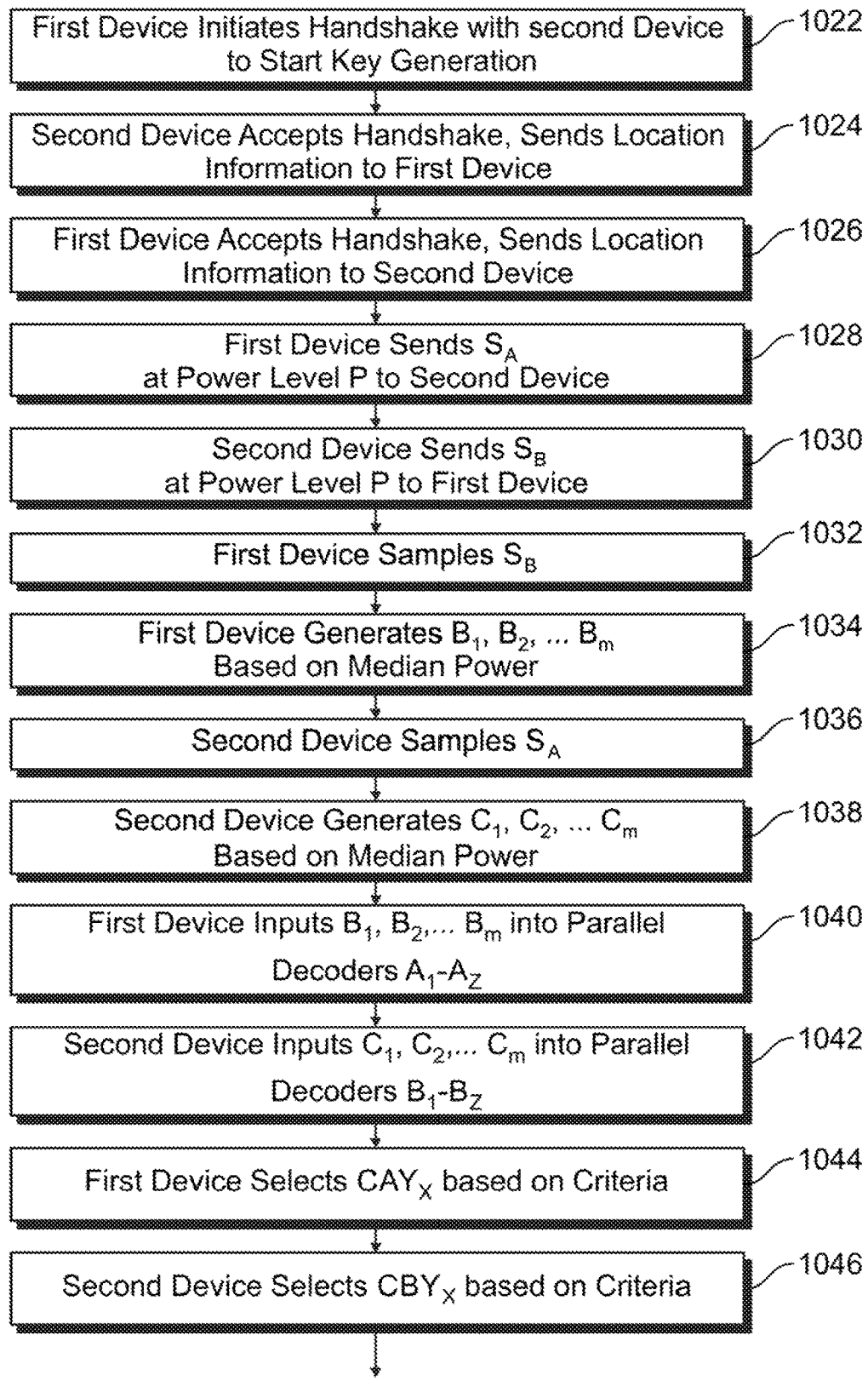
FIG. 10C is a flow diagram illustrating example operations performed in example devices of FIG. 8B that utilize parallel decoders; and, FIG. 10D is a flow diagram illustrating further example operations performed in example devices of FIG. 8B that utilize parallel decoders.

FIG. 10C is a flow diagram illustrating cryptography operations performed in example communicating devices, such as devices 802 and 804 of FIGS. 8A and 8B using parallel decoders. The operations performed in FIG. 10 may be explained using device 802 as the first device and device 804 as the second device of FIG. 10C. In the process of FIG. 10C, operations 1022, 1024, 1026, 1028, and 1030 may be performed as was described for operations 902, 904, 906, 908, and 910 of FIG. 9A. After operations 1022, 1024, 1026, 1028, and 1030 are performed the process moves to 1032.

At 1032, device 102 samples signal $S_B$ 818. To perform the sampling, cryptography setup transceiver 820 provides the received signal $S_B$ 818 to sampler 822 as signal 850 and sampler 822 performs sampling on signal $S_B$ 818 to generate sampling results. Sampler 822 may perform the sampling by generating a series of samples, $S_1$, $S_2$ ... $S_N$, with each sample taken from signal $S_B$ 818 at a predetermined time interval. Each sample of $S_1$, $S_2$ ... $S_N$ may comprise bits that represent a value of power of signal $S_B$ 818 at the time the sample was taken. Next, at 1034, device 102 generates a bit string from the results of the sampling on signal $S_B$ 818. In performing the bit string generation, sampler 822 provides the sampling results to bit string generator 824 as signal 852. Bit string generator 824 may then generate the bit string, $B_1$, $B_2$ ... $B_M$, from the sampling results. In generating the bit string, bit string generator 824 may use only the samples of $S_1$, $S_2$ ... $S_N$ that indicate a value of power above a threshold level. The threshold level used for generating the bit string in device 802 may be set by bit string generator 824 to the median power level of the samples in the received signal $S_B$ 818. The median power level may be determined over the time period within which the samples are taken. This may be performed as shown in FIG. 3A with $PL_1$ 302 set to the median power level. The bit string generator 824 may process the complete sampling results in this manner to generate a bit string $B_1$, $B_2$ ... $B_M$ for use in key creation in device 102.

At 1036, device 804 may initiate the same sampling and bit string generation operations on the signal $S_A$ 812 as performed in device 802 at operations 1032 and 1034 on the signal $S_A$ 812. To perform the sampling at device 804, cryptography setup transceiver 834 provides the received signal $S_A$ 812 to sampler 836 as signal 862 and sampler 836 performs sampling on signal $S_A$ 812 to generate a series of samples, $S'_1$, $S'_2$ ... $S'_N$, each sample taken from signal $S_A$ 812 at a predetermined time interval. Next, at 1038, device 804 generates a bit string from the results of the sampling on signal $S_A$ 812. In performing the bit string generation, sampler 836 provides the sampling results as signal 864 to bit string generator 838. Bit string generator 838 may then generate a bit string, $C_1$, $C_2$ ... $C_M$, from the sampling results. In generating the bit string, bit string generator 838 may use only the samples of $S'_1$, $S'_2$ ... $S'_N$ that indicate a value of power or amplitude above a threshold level. The threshold used for generating the bit string in device 804 may be set by bit string generator 838 to the median power level of the samples in the received signal $S_A$ 812. The median power level may be determined over the time period within which the samples are taken. If the power of a sample $S'_X$ is below the threshold it may be ignored. If the power of the sample $S'_X$ is above the threshold the bits representing the power sample $S'_X$ may be placed as a set of bits in the bit string. This may be performed as shown in FIG. 3B with $PL_2$ 304 set to the median power level. The bit string generator 824 may then process the complete sampling results in this manner to generate a bit string $C_1$, $C_2$ ... $C_M$ for use in key creation in device 804. Use of signals $S_A$ 812 and $S_B$ 818 that are identical, and use of processes for signal sampling and bit string generation that are the same in each of the devices 802 and 804, provides a bit string, $B_1$, $B_2$ ... $B_M$, and a bit string, $C_1$, $C_2$ ... $C_M$, that are identical, or nearly identical, to one another. Because $S_A$ 812 and $S_B$ 818 are sent at the same transmission power level P, the threshold levels $PL_1$ and PL$_2$ determined from the sampling results and used, respectively, in devices 802 and 804 should be identical or nearly identical.

At 1040, bit string generator 824 provides bit string, B$_1$, B$_2$ . . . B$_M$, to key creator 826. Key creator 826 then inputs each B$_X$ of bit string B$_1$, B$_2$ . . . B$_M$, one at a time, into parallel decoders A$_1$-A$_Z$ of FIG. 10A to generate a set of Z keys. For each B$_X$, where X=1 to M, a plurality of Z key sets, CA1$_X$-CAZ$_X$, is generated. In the operation of 1040, each decoder A$_1$-A$_Z$ may be considered to be functioning in parallel, with each decoder operating as was described for decoder A in FIGS. 4A-4B, and 5A-5B. The generated keys will comprise a set of Z keys from which a key may be selected. For example a first key comprising the bit strings CA1$_1$, CA1$_2$, CA1$_3$ . . . CA1$_M$, is generated from decoder A$_1$, a second key comprising the bit strings CA2$_1$, CA2$_2$, CA2$_3$ . . . CA2$_M$, is generated from decoder A$_2$, and a Zth key comprising the bits strings CAZ$_1$, CAZ$_2$, CAZ$_3$ . . . CAZ$_M$, is generated from decoder A$_Z$. There will be a key generated for each of the Z decoders. The generated key set comprises each of the Z keys.

At 1042, bit string generator 838 of device 804 provides bit string, C$_1$, C$_2$ . . . C$_M$, to key creator 840. Key creator 840 then inputs each C$_X$ of bit string C$_1$, C$_2$ . . . C$_M$ sequentially into parallel decoders B$_1$-B$_Z$ of FIG. 10B to generate Z key sets in an identical manner as was described for device 802 at operation 1040. For example a first key comprising the bit strings CB1$_1$, CB1$_2$, CB1$_3$ . . . CB1$_M$ is generated from decoder B$_1$, a second key comprising the bit strings CB2$_1$, CB2$_2$, CB2$_3$ . . . CB2$_M$ is generated from decoder B$_2$, and a Zth key comprising the bit strings CBZ$_1$, CBZ$_2$, CBZ$_3$ . . . CBZ$_M$, is generated from decoder B$_Z$. There will be a key generated for each of the Z decoders in device 804. The generated key set comprises each of the Z keys.

At 1044, key creator 826 of device 802 selects a key CAY$_X$ from the key sets CA1$_X$-CAZ$_X$, where X=1 to M, and Y equals the index of the decoder that generated the key. For example, key CAY$_X$ may be selected as the key comprising the bit strings output from decoder A$_1$ as CA1$_X$, X=1 to M. At 1046, key creator 840 selects a key CBY$_X$ from the key sets CB1$_X$-CBZ$_X$, where X=1 to M, and Y equals the index of the decoder that generated the key. For example, key CBY$_X$ may be selected as the key comprising the bit strings output from decoder B$_1$ as CB1$_X$, X=1 to M. Devices 802 and 804 may select the keys CAY$_X$ and CBY$_X$ by using successive test keys at each device to encrypt test communications between the devices, and then select a pair that functions correctly.

Figure 10D:
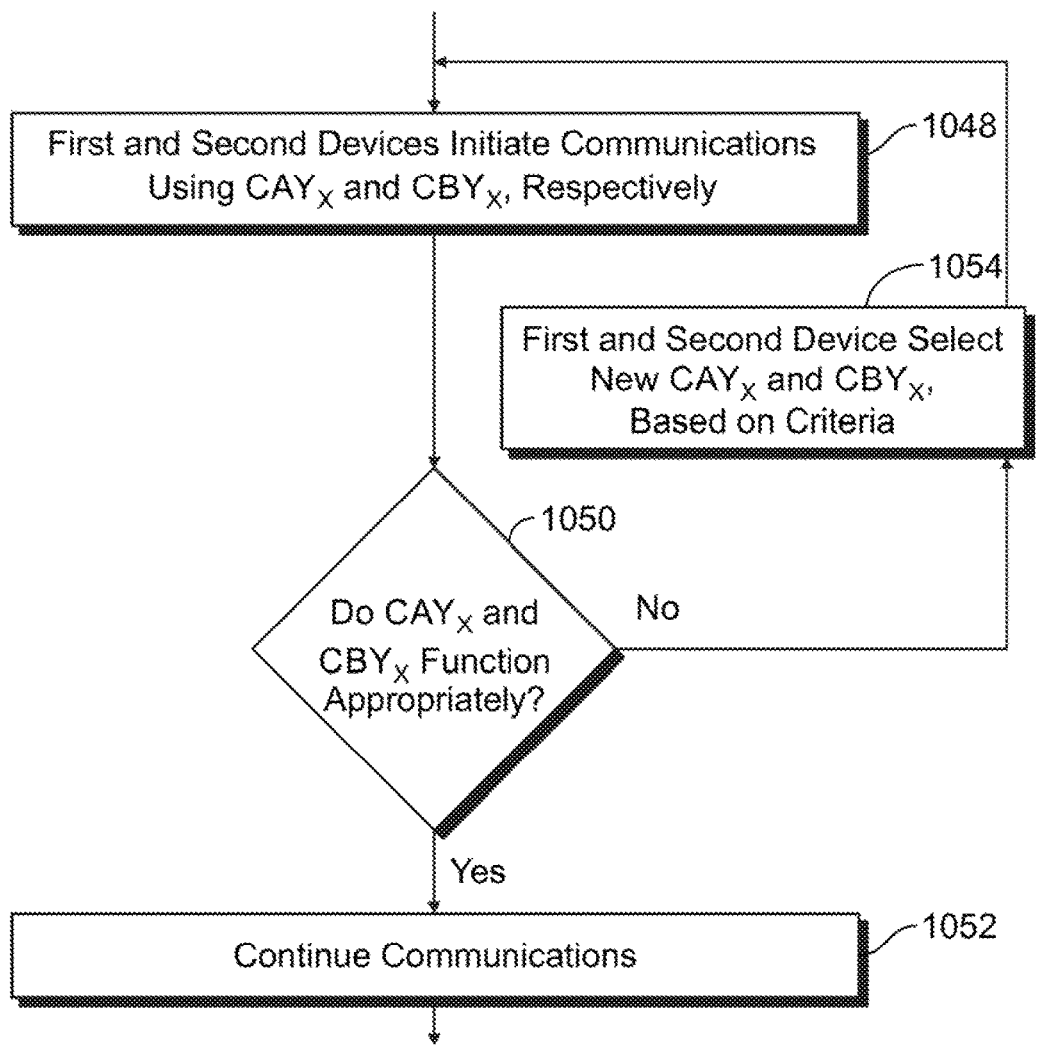

FIG. 10D is a flow diagram illustrating further example operations performed to select a key from a key set in the process of FIG. 10C. The operations of FIG. 10D may be used by devices 802 and 804 at operations 1044 and 1046 of FIG. 10C.

At 1048, key creators 826 and 840 in devices 802 and 804 select a key, CAY$_X$ and CBY$_X$, X=1 to M, respectively. On the initial performance of 938, Y may equal 1 and the selected keys may be the bit strings comprising CA1$_X$ and CB1$_X$, X=1 to M, generated by decoders A$_1$ and B$_1$, respectively. At 1050, devices 802 and 804 may communicate encrypted test signals between cryptography setup transceivers 820 and 834 to determine whether the keys have been generated correctly in each device, i.e., to determine whether the keys are the same and function appropriately. If the test signals are correctly encrypted and decrypted at both devices 802 and 804, the process moves to 1052 and the currently selected keys CA1$_X$ and CB1$_X$, X=1 to M, are used by devices 802 and 804 to continue encrypting and decrypting communications between devices 802 and 804. If the test signals are not correctly encrypted and decrypted at both devices 802 and 804, the process moves to 1054. At 1054, device 802 and 804 select a different CAY$_X$ and CBY$_X$, X=1 to M, respectively. The keys may be selected at 1054 by incrementing Y. For example, in an implementation in which Y equals 1 on the initial performance of 1048, Y may be incremented by 1 at each pass though operation 1048. In this manner keys CA1$_X$ and CB1$_X$, are tested first, followed by keys CA2$_X$ and CA2$_X$, and then keys CA3$_X$ and CB3$_X$, up to keys CAZ$_X$ and CBZ$_X$, in sequence. From 1054 the process moves to 1048 and the operations of 1048, 1050, and 1054 are repeated, each time incrementing the index Y, until the currently selected keys CAY$_X$ and CBY$_X$, X=1 to M, that were selected at the last performance of operation 1048 are determined to function appropriately. The process then moves to 1052 and the currently selected keys CAY$_X$ and CBY$_X$, X=1 to M, are used to continue encrypting and decrypting communications between devices 802 and 804. The use of the parallel decoders A$_1$-A$_Z$ and decoders B$_1$-B$_X$ allow a more robust key generation process. For example, if the setup signals S$_A$ and S$_B$ are transmitted in a high interference RF environment, keys CA1$_X$ and CB1$_X$ may not be generated identically and not function. In this case, it may be determined that another pair of keys CA2$_X$ and CB2$_X$, or CA3$_X$ and CB3$_X$, may be used, respectively, in device 802 and device 804, The disclosed implementations included a first device comprising one or more processors and memory in communication with the one or more processors, the memory comprising code that, when executed, causes the one or more processors to control the first device to receive a setup signal from a second device, sample the setup signal and generate sampling results, create a plurality of keys using the sampling results, select a key from the plurality of keys, and, utilize the selected key to exchange at least one data signal with the second device. The code may further causes the one or more processors to control the first device to sample the first setup signal and create the plurality of keys by controlling the device to sample the setup signal and generate the sampling results as a plurality of sets of bits, wherein each of the sets of bits indicates a magnitude of a sampled level, create a first key of the plurality of keys by creating the first key from selected bits of each of the plurality of sets of bits indicating a magnitude above a first threshold, and, create a second key of the plurality of keys by creating the second key from the selected bits of each of the plurality of sets of bits indicating a magnitude above a second threshold. The selected bits of each of the plurality of sets of bits may comprise the most significant bits of each of the plurality of sets of bits. The selected bits of each of the plurality of sets of bits may indicate a magnitude of power, and the first threshold may comprise a median power of the magnitudes indicated by the plurality of sets of bits. The setup signal may comprise a first setup signal and the code may further cause the one or more processors to control the first device to send a second setup signal to the second device, wherein the second setup signal is identical to the first setup signal sent by the second device.

The first device may further comprise a plurality of decoders in communication with the one or more processors and the code may further cause the one or more processors to control the first device to sample the setup signal and create the plurality of keys by controlling the device to sample the setup signal and generate the sampling results as a plurality of sets of bits, create a first key of the plurality of keys by inputting selected bits of each of the plurality of sets of bits into a first decoder of the plurality of decoders, and, create a second key of the plurality of keys by inputting the selected bits of each of the plurality of sets of bits into a second decoder of the plurality of decoders. Each of the plurality of sets of bits may indicate a magnitude of power of a sampled level, and the selected bits may comprise selected bits of each of the plurality of sets of bits that indicate a magnitude above a power threshold. The selected bits of each of the plurality of sets of bits may comprise most significant bits of each of the plurality of sets of bits. The first decoder and second decoder may generate different codes words from the selected bits of the plurality of sets of bits. The setup signal may comprise a first setup signal and the code may further cause the one or more processors to control the first device to send a second setup signal to the second device, where the second setup signal is identical to the first setup signal sent by the second device. The setup signal may comprise a first setup signal and the code may cause the one or more processors to control the first device to receive a location from the second device, and, determine a transmission power for sending a second setup signal to the second device based on the location and a target received power of the second setup signal at the second device. The location may comprise a second location and the code may further cause the one or more processors to control the first device to send a first location to the second device and determine the transmission power for sending the second setup signal to the second device based on the first and second locations and the target received power of the second setup signal at the second device. The code may cause the one or more processors to control the first device to select a key from the plurality of keys by controlling the device to test a first key from the plurality of keys by encrypting and decrypting communications with the second device, determine that the first key has correctly encrypted and decrypted the communications, and, select the first key from the plurality of keys base on the determination that the first key has correctly encrypted and decrypted the communications.

The disclosed implementation also include a method comprising receiving a setup signal at a first device, the first setup signal sent from a second device, sampling the setup signal and generating sampling results, creating a plurality of keys using the sampling results, selecting a key from the plurality of keys, and, utilizing the selected key at the first device to exchange at least one data signal with the second device. The sampling the setup signal and generating the sampling results may comprise sampling the setup signal and generating the sampling results as a plurality of sets of bits, wherein each of the sets of bits indicates a magnitude of a sampled level, and, the creating a plurality of keys using the sampling results may comprise creating a first key of the plurality of keys by creating the first key from selected bits of each of the plurality of sets of bits indicating a magnitude above a first threshold, and, creating a second key of the plurality of keys by creating the second key from selected bits of each of the plurality of sets of bits indicating a magnitude above a second threshold. The sampling the setup signal and generating the sampling results may comprise sampling the setup signal and generating the sampling results as a plurality of sets of bits, and, the creating a plurality of keys using the sampling results may comprises creating a first key of the plurality of keys by inputting selected bits of the plurality of sets of bits into a first decoder of a plurality of decoders, and, creating a second key of the plurality of keys by inputting the selected bits of the plurality of sets of bits into a second decoder of a plurality of decoders.

The disclosed implementations further include a first device comprising one or more processors and memory in communication with the one or more processors, the memory comprising code that, when executed, causes the one or more processors to control the first device to receive a setup signal from a second device, generate sampling results from the setup signal as a plurality of sets of bits, wherein each of the sets of bits indicates a magnitude of a sampled level, create a plurality of keys, wherein each of the plurality of keys is created from selected bits of one of the plurality of sets of bits having a magnitude meeting a criteria, select a key from the plurality of keys, and, utilize the selected key to encrypt at least one data signal sent to the second device and decrypt at least one data signal received from the second device. The code may further cause the one or more processors to control the first device to create the plurality of keys by controlling the device to create a first key of the plurality of keys by creating the first key from the selected bits of each of the plurality of sets of bits indicating a magnitude above a first threshold, and, create a second key of the plurality of keys by creating the second key from the selected bits of each of the plurality of sets of bits indicating a magnitude above a second threshold. The code may further cause the one or more processors to control the first device to create the plurality of keys by controlling the device to create a first key of the plurality of keys by inputting the selected bits of each of the plurality of sets of bits into a first decoder of the plurality of decoders, and, create a second key of the plurality of keys by inputting the selected bits of each of the plurality of sets of bits into a second decoder of the plurality of decoders. The selected bits of each of the plurality of sets of bits may comprise most significant bits of each of the plurality of sets of bits.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any appropriate functional blocks, type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A first device comprising:
    a processor; and
    a memory in communication with the processor, the memory comprising executable instructions that, when executed by the processor, cause the processor to control the first device to perform functions of:
        receiving a first setup signal from a second device;
        sampling the first setup signal to generate a plurality of sampling values;
        selecting, based on a first threshold value, a first set of the sampling values;
        generating, based on the selected first set of the sampling values, a first key;
        selecting, based on a second threshold value, a second set of the sampling values;
        generating, based on the selected second set of the sampling values, a second key;
        attempting, using at least one of the first and second keys, an encrypted communication with the second device;
        determining that one of the first and second keys allows the encrypted communication with the second device; and
        using the one of the first and second keys that allows the encrypted communication, continuing the encrypted communication with the second device.

2. The first device of claim 1, wherein each of the plurality of sampling values comprises a set of bits indicating a magnitude of the sampled value.

3. The first device of claim 2, wherein, to select the first set of the sampling values, the instructions, when executed by the processor, cause the processor to control the first device to perform a function of selecting a plurality of sets of bits indicating a magnitude above the first threshold value.

4. The first device of claim 3, wherein, to create the first key, the instructions, when executed by the processor, cause the processor to control the first device to perform functions of:
    selecting a number of bits from each selected set of bits indicating a magnitude above the first threshold value; and
    combining the number of bits from each selected set of bits together.

5. The first device of claim 4, wherein, to select a number of bits, the instructions, when executed by the processor, cause the processor to control the first device to perform functions of selecting a number of most significant bits of each selected set of bits.

6. The first device of claim 2, wherein, to select the second set of sampling values, the instructions, when executed by the processor, cause the processor to control the first device to perform a function of selecting a plurality of sets of bits indicating a magnitude above the second threshold value.

7. The first device of claim 6, wherein, to create the second key, the instructions, when executed by the processor, cause the processor to control the first device to perform functions of:
    selecting a number of bits from each selected set of bits indicating a magnitude above the second threshold value; and
    combining the number of bits from each selected set of bits together.

8. The first device of claim 7, wherein, to select a number of bits, the instructions, when executed by the processor, cause the processor to control the first device to perform functions of selecting a number of most significant bits of each selected set of bits.

9. The first device of claim 2, wherein, to create the first and second keys, the instruction, when executed by the processor, cause the processor to control the first device to perform functions of:
    selecting a plurality of first sets of bits indicating a magnitude above the first threshold value;
    selecting a plurality of second sets of bits indicating a magnitude above the second threshold value;
    inputting at least some of the selected first sets of bits into a first decoder; and
    inputting at least some of the selected second sets of bits into a second decoder.

10. The first device of claim 9, wherein the first decode has a lower error correction capability than the second decoder.

11. A method of operating a first device, comprising:
    receiving a first setup signal from a second device;
    sampling the first setup signal to generate a plurality of sampling values;
    selecting, based on a first threshold value, a first set of the sampling values;
    generating, based on the selected first set of the sampling values, a first key;
    selecting, based on a second threshold value, a second set of the sampling values;
    generating, based on the selected second set of the sampling values, a second key;
    attempting, using at least one of the first and second keys, an encrypted communication with the second device;
    determining that one of the first and second keys allows the encrypted communication with the second device; and
    using the one of the first and second keys that allows the encrypted communication, continuing the encrypted communication with the second device.

12. The method of claim 11, wherein each of the plurality of sampling values comprises a set of bits indicating a magnitude of the sampled value.

13. The method of claim 12, wherein selecting the first set of the sampling values comprises selecting a plurality of sets of bits indicating a magnitude above the first threshold value.

14. The method of claim 13, wherein creating the first key comprises:
    selecting a number of bits from each selected set of bits indicating a magnitude above the first threshold value; and
    combining the number of bits from each selected set of bits together.

15. The method of claim 14, wherein selecting a number of bits comprises selecting a number of most significant bits of each selected set of bits.

16. The method of claim 12, wherein selecting the second set of sampling values comprises selecting a plurality of sets of bits indicating a magnitude above the second threshold value.

17. The method of claim 16, wherein creating the second key comprises:
selecting a number of bits from each selected set of bits indicating a magnitude above the second threshold value; and
combining the number of bits from each selected set of bits together.

18. The method of claim 17, wherein selecting a number of bits comprises selecting a number of most significant bits of each selected set of bits.

19. The method of claim 12, wherein creating the first and second keys comprises:
selecting a plurality of first sets of bits indicating a magnitude above the first threshold value;
selecting a plurality of second sets of bits indicating a magnitude above the second threshold value;
inputting at least some of the selected first sets of bits into a first decoder; and
inputting at least some of the selected second sets of bits into a second decoder.

20. The method of claim 19, wherein the first decode has a lower error correction capability than the second decoder.

21. A non-transitory computer readable medium containing instructions for causing a computer to perform functions of:
receiving a first setup signal from a second device;
sampling the first setup signal to generate a plurality of sampling values;
selecting, based on a first threshold value, a first set of the sampling values;
generating, based on the selected first set of the sampling values, a first key;
selecting, based on a second threshold value, a second set of the sampling values;
generating, based on the selected second set of the sampling values, a second key;
attempting, using at least one of the first and second keys, an encrypted communication with the second device;
determining that one of the first and second keys allows the encrypted communication with the second device; and
using the one of the first and second keys that allows the encrypted communication, continuing the encrypted communication with the second device.

22. The non-transitory computer readable medium of claim 21, each of the plurality of sampling values comprises a set of bits indicating a magnitude of the sampled value, wherein:
selecting the first set of the sampling values comprises selecting a plurality of sets of bits indicating a magnitude above the first threshold value, and
selecting the second set of sampling values comprises selecting a plurality of sets of bits indicating a magnitude above the second threshold value.

23. The non-transitory computer readable medium of claim 22, wherein:
creating the first key comprises:
selecting a number of bits from each selected set of bits indicating a magnitude above the first threshold value; and
combining the number of bits from each selected set of bits together, and creating the second key comprises:
selecting a number of bits from each selected set of bits indicating a magnitude above the second threshold value; and
combining the number of bits from each selected set of bits together.

* * * * *